(12) United States Patent
Cook et al.

(10) Patent No.: US 10,896,141 B2
(45) Date of Patent: Jan. 19, 2021

(54) GATHER-SCATTER CACHE ARCHITECTURE HAVING PLURALITY OF TAG AND DATA BANKS AND ARBITER FOR SINGLE PROGRAM MULTIPLE DATA (SPMD) PROCESSOR

(71) Applicant: Intel Corporation, Santa Clara, CA (US)

(72) Inventors: Jeffrey J. Cook, Portland, OR (US); Jonathan D. Pearce, Hillsboro, OR (US); Srikanth T. Srinivasan, Portland, OR (US); Rishiraj A. Bheda, Hillsboro, OR (US); David B. Sheffield, Portland, OR (US); Abhijit Davare, Hillsboro, OR (US); Anton Alexandrovich Sorokin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 16/364,725

(22) Filed: Mar. 26, 2019

(65) Prior Publication Data

US 2020/0310992 A1    Oct. 1, 2020

(51) Int. Cl.
| | |
|---|---|
| *G06F 13/16* | (2006.01) |
| *G06F 9/38* | (2018.01) |
| *H04L 9/06* | (2006.01) |
| *G06F 12/0815* | (2016.01) |

(52) U.S. Cl.
CPC ........ *G06F 13/1615* (2013.01); *G06F 9/3816* (2013.01); *G06F 12/0815* (2013.01); *H04L 9/0643* (2013.01); *G06F 2212/1024* (2013.01)

(58) Field of Classification Search
CPC ............... G06F 13/1615; G06F 9/3816; G06F 12/0815; G06F 2212/1024; H04L 9/0643
USPC .................................. 711/120, 140, 169, 129
See application file for complete search history.

(56) References Cited

U.S. PATENT DOCUMENTS

| | | | | |
|---|---|---|---|---|
| 5,193,166 A | * | 3/1993 | Menasce | G06F 12/02 365/230.01 |
| 5,717,882 A | | 2/1998 | Abramson et al. | |
| 5,826,052 A | * | 10/1998 | Stiles | G06F 12/0811 712/205 |
| 6,128,704 A | * | 10/2000 | Jun | G06F 12/0855 711/140 |
| 6,859,861 B1 | * | 2/2005 | Rhodes | G06F 12/0897 711/117 |

(Continued)

OTHER PUBLICATIONS

U.S. Appl. No. 16/364,688, filed Mar. 26, 2019, entitled "System, Apparatus and Method for Program Order Queue (POQ) to Manage Data Dependencies in Processor Having Multiple Instruction Queues" by Andrey Ayupov, et al.

(Continued)

*Primary Examiner* — Hong C Kim
(74) *Attorney, Agent, or Firm* — Trop, Pruner & Hu, P.C.

(57) ABSTRACT

In one embodiment, a cache memory includes: a plurality of data banks, each of the plurality of data banks having a plurality of entries each to store a portion of a cache line distributed across the plurality of data banks; and a plurality of tag banks decoupled from the plurality of data banks, wherein a tag for a cache line is to be assigned to one of the plurality of tag banks. Other embodiments are described and claimed.

20 Claims, 18 Drawing Sheets

(56) References Cited

U.S. PATENT DOCUMENTS

| | | | |
|---|---|---|---|
| 7,904,905 B2 | 3/2011 | Cervini | |
| 8,990,505 B1 | 3/2015 | Jamil et al. | |
| 2002/0188806 A1* | 12/2002 | Rakvic | G06F 12/0897 711/119 |
| 2008/0209129 A1* | 8/2008 | Van De Waerdt | G06F 12/1045 711/131 |
| 2008/0222387 A1* | 9/2008 | Williamson | G06F 12/0864 711/216 |
| 2013/0046922 A1* | 2/2013 | Pan | G06F 12/0895 711/104 |
| 2014/0325153 A1 | 10/2014 | Huang | |
| 2016/0147669 A1* | 5/2016 | Huang | G06F 12/082 711/128 |
| 2017/0351610 A1* | 12/2017 | Tran | G06F 12/0875 |
| 2018/0189179 A1* | 7/2018 | Li | G06F 12/0811 |
| 2019/0042269 A1 | 2/2019 | Pearce et al. | |

OTHER PUBLICATIONS

U.S. Appl. No. 16/364,704, filed Mar. 26, 2019, entitled "System, Apparatus and Method for Symbolic Store Address Generation for Data-Parallel Processor" by Jeffrey J. Cook, et al.

U.S. Appl. No. 16/147,696, filed Sep. 29, 2018, entitled "Apparatus and Method for Adaptable and Efficient Lane-Wise Tensor Processing," by Jonathan Pearce, et al.

U.S. Appl. No. 16/220,528, filed Dec. 14, 2018, entitled "Appartus and Method for a High Throughput Parallel Co-Processor and Interconnect With Low Offload Latency," by Jonathan Pearce, et al.

U.S. Appl. No. 16/147,692, filed Sep. 29, 2018, entitled "Architecture and Method for Data Parallel Single Program Multiple Data (SPMD) Execution," by Jonathan Pearce, et al.

Jie S. Hu, et al., "Exploring Wakeup-Free Instruction Scheduling," Feb. 14, 2004, 10 pages total.

Sam S. Stone, et al., "Address-Indexed Memory Disambiguation and Store-To-Load Forwarding," Nov. 12, 2015, 12 pages total.

Erika Gunadi, et al., "CRIB: Consolidated Rename, Issue and Bypass," Jun. 4, 2011, 10 pages total.

European Patent Office, European Search Report dated Aug. 3, 2020 in European patent application No. 20 153 354.4, 8 pages total.

Ritchie Zhao, et al., "Improving High-Level Synthesis With Decoupled Data Structure Optimization," DAC '16, Jun. 5, 2016, 6 pages total.

Honesty Cheng Yung, "Evaluation of a Decoupled Computer Architecture and the Design of a Vector Extension," Jul. 1985, 112 pages.

Honesty C. Yung, et al. "The Design of a Queue-Based Vector Supercomputer," 1986, 4 pages.

\* cited by examiner

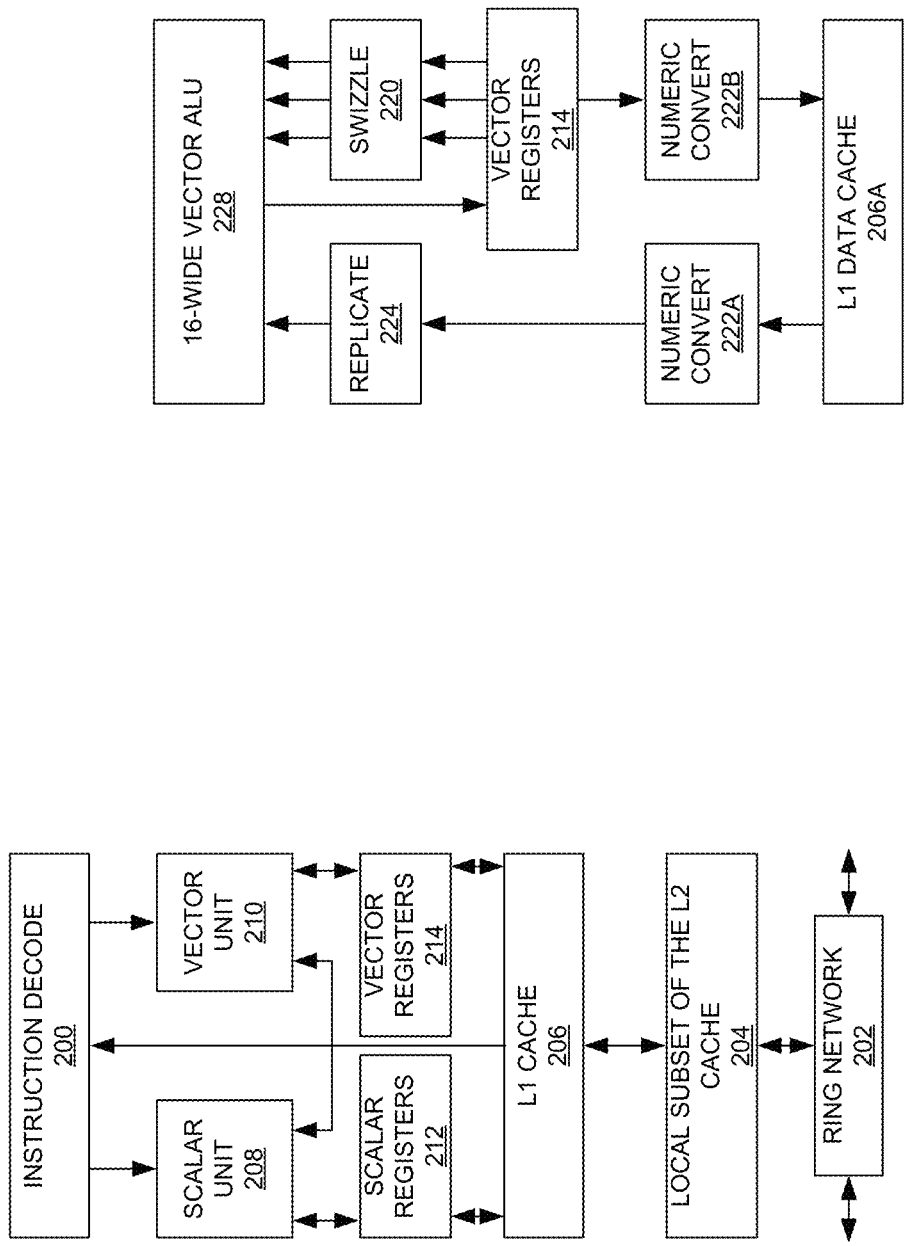

GATHER-SCATTER CACHE ARCHITECTURE HAVING PLURALITY OF TAG AND DATA BANKS AND ARBITER FOR SINGLE PROGRAM MULTIPLE DATA (SPMD) PROCESSOR

TECHNICAL FIELD

Embodiments relate to a cache memory for use in a processor.

BACKGROUND

A data-parallel processor uses a first-level cache architecture for cacheable data-parallel memory accesses as a bandwidth amplification interface to a next level of the cache/memory system. A single program multiple data (SPMD) processor coordinates many execution lanes as a group to amortize control logic and state for density and energy efficiency. For load or store operations, the execution lanes simultaneously request the memory subsystem to service each lane's requested address. In general, each lane may request a distinct address such that collectively the lanes present a gather/scatter pattern. Oftentimes however (especially for loads), many lanes request the same address such that the lanes present one or more broadcast patterns. However, at the cache pipeline interface the relationship between lane addresses is unknown a priori. As a result, typical cache memory architectures are not designed to handle such workloads efficiently, from either of a timing or power point of view.

BRIEF DESCRIPTION OF THE DRAWINGS

FIGS. 2A-B illustrate a block diagram of a more specific exemplary in-order core architecture in accordance with an embodiment of the present invention.

DETAILED DESCRIPTION

Figure 1A:
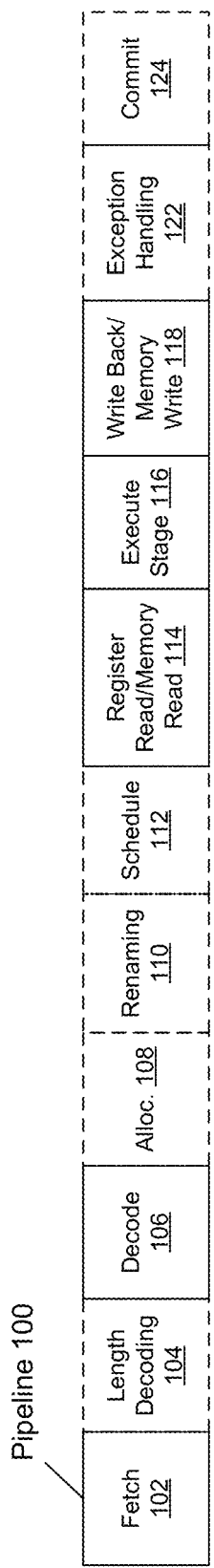
FIG. 1A is a block diagram illustrating both an exemplary in-order pipeline and an exemplary register renaming, out-of-order issue/execution pipeline according to embodiments of the invention.

In various embodiments, a cache architecture for a processor is provided having data cache and sequencer (DCS) circuitry that controls operation of the cache memory to have a highly banked first-level cache pipeline. With this arrangement, the cache may operate with a fixed latency (namely a fixed load-to-use latency), with a new transaction presented every cycle. In an embodiment, the cache memory is configured to: (1) arbitrate bank accesses and detect/service shared tag lookups and broadcasts without imposition of an all-to-all address comparison network of $N^2/2$ comparators; and (2) performantly coordinate sets of disjoint cache banks (to limit fanout and wire length of crossbar networks) with specific optimizations for the coincident nature of lane requests.

Techniques are provided within an embodiment to arbitrate lane requests to cache banks without an address comparison. Instead, cache bank arbitration is performed based on comparing lane bank demands (and with a configurable hash function) and a given fairness mechanism. Still further, embodiments provide techniques to detect and service multiple shared tag lookup requests with unique data requests in a single pipeline pass without $N^2/2$ comparators.

To effect such operation, the cache architecture is arranged with tag banks decoupled from data banks. In turn, the result of tag lookups are shared across data bank demands, even if not originated from that lane, by comparing only to the tag used for lookup. In addition, embodiments provide techniques to detect and service multiple broadcast patterns in a single pipeline pass without $N^2/2$ comparators, realized in part by deferring address comparison until a last phase of the pipeline and comparing a lane address only to the address that won arbitration to the lane's demanded data bank. Still further, the cache architecture is arranged to coordinate disjoint cache banks (which reduce area and latency) to limit fanout and wire length of crossbar networks. This arrangement is realized by dedicating sets of cache banks to subsets of lanes and by unifying their interface to a next level of a cache hierarchy, with specific optimizations for the coincident nature of lane requests presented to the disjoint cache banks. For example, coincident load misses among sets of cache banks may coalesce (without performing CAM) fill buffers and may populate broadcast refill snoop filters to optimize fill bandwidth utilization between cache bank sets and between the cache bank sets and the next level cache.

With embodiments herein, a cache architecture is provided with a fixed latency (and latency-minimized) micro-architecture that services all request patterns, from broadcasts to contiguous and overlapping words to gather/scatter and any combination thereof in a single pass of the memory pipeline. Such accesses may be constrained only by the structural hazard of the number of ports per tag bank or data bank. Still further, embodiments enable tags and cache lines to be duplicated to limit fanout and wire lengths of crossbar networks for area and latency considerations. In this way, a cache architecture is provided for a high performance data-parallel SPMD processor that targets both regular and irregular data access workload patterns, including, as examples, matrix-matrix multiplication, stencil, molecular dynamics, and lattice quantum chromodynamics workloads.

In one particular embodiment, a DCS may be used in a cache architecture having 8 tag banks and 8 data banks. In this embodiment, a cache line tag may be assigned to only one tag bank. Each cache line present in the cache memory is distributed across the 8 data banks, such that for a 64-byte cache line, 8 bytes from that line are stored in each data bank. This architecture enables all bytes from a cache line to be accessed in a single pass, and also enables access to 8-byte chunks from independent cache lines. This organization is in contrast to other caches that bank data by set, holding a whole cache line in a single data bank. Also in this implementation, each execution lane accesses 8 bytes per cycle, as the execution lanes have an 8-byte wide cache interface.

A cache architecture in accordance with an embodiment is configured to satisfy all combinations of bank-aligned patterns (lane requests are all load or store per transaction) in a single pass of the pipeline (when tag or data port structural conflicts do not occur) including: load broadcasts the same word to two or more lanes; load consecutive words to lanes; load gather words from unique cache lines to lanes; store the same word from two or more lanes; store consecutive words from lanes; and store words to unique cache lines from lanes. Embodiments having one or more DCS circuits in accordance with an embodiment may deliver 8-byte words from up to 32 cache lines per cycle (256 bytes per cycle) gather performance, with a minimal 7 cycle hit latency.

To meet these disparate patterns and not require $N^2/2$ comparators for an all-to-all address comparison matrix, embodiments are configured to defer address comparisons until required, namely when data is returned from the data banks to the execution lanes. In this way, only needed address comparisons are performed and cooperative coincident requests are discovered when and where profitable.

In an embodiment, a pipelined cache architecture may operate with a fixed 7 cycle load-to-use latency, e.g., when operating at a frequency between 1.5-2 GHz. With embodiments, tag bank and data bank arbitration may proceed concurrently for a given access request. And in some cases, the data arbitration may leverage priority based on lane winners of tag arbitration. In an embodiment, the memory load or store address requested from each lane is hashed using a XOR hash function to determine a destination tag bank that may hold the tag for the lane's request. Conceptually, the hash output is a one-hot bit vector of length equal to number of tag banks, where the i'th bit represents a demand for the i'th tag bank. In an embodiment, bit vector may be generated per lane equal to 8 bits, with a single bit set (one hot) to indicate the requested tag bank for that lane. In one embodiment, calculation of these hash functions may be performed on a per lane basis within the DCS, using hardware of the DCS. In this way, efficient tag bank and data bank indexes may be generated. Of course in other instances, the hash functions may be performed in another component, such as within the execution lanes themselves.

The tag arbiter for the i'th tag bank inspects the bit vector of i'th-bit demand bits from the lanes and chooses a subset of lanes for a given arbitration round. More specifically in a representative embodiment, the tag arbiter selects 2 lanes (as each tag bank has 2 read ports). Of course in other embodiments more or fewer lanes may be selected per arbitration round. The arbitration may proceed by inspecting the demand bits themselves and not the lane request addresses. In an embodiment, the tag arbiter may implement a round-robin fairness mechanism to prioritize the next lane index for winning arbitration. Based on the arbitration result, the tag arbiter then configures a lane-to-tag bank crossbar to enable a tag portion of the lane request address to be sent from the winning lanes to that tag bank.

Likewise for data banks, the lane request addresses are hashed (e.g., using a XOR hash function), and a data arbiter (per data bank) selects a subset of lanes for a given arbitration round. More specifically in a representative embodiment the data arbiter selects 2 lanes (as each data bank has 2 read ports). Of course in other embodiments more or fewer lanes may be selected per arbitration round. In an embodiment, the data arbiter may select winners based on the demands themselves and further prioritizing lanes that won tag bank arbitration. Based on the arbitration result, the data arbiter then configures a lane-to-data bank crossbar to enable the lane request address to be sent from the winning lanes to that data bank.

With an embodiment, it is possible to detect and service multiple duplicate tag lookup requests in a single pass of the pipeline. This is the case, as each tag bank performs up to 2 lookups from lanes that won tag arbitration. The outputs of the tag bank (the way number, etc.) along with the tag used for the lookup are then placed as an input on a tag result crossbar. Any lane that won data bank arbitration (even if it did not win tag bank arbitration) configures the tag result crossbar to deliver the lookups from that lane's demanded tag bank to its destination data bank. At the data bank, the lane's tag address is compared with up to 2 tags from the lane's demanded tag bank. In this way, if at least one lane performs a tag lookup hit for a cache line X, then all lane data bank winners for cache line X may proceed with data lookup.

Embodiments further enable detection and servicing of multiple broadcast patterns in a single pass of the pipeline. The output of the data bank (namely an 8-byte sub-cacheline word) is then placed as an input on a data return crossbar. The tags used for data bank lookup are placed on a data address bus. Each lane then compares its address with up to 2 tags from the lane's demanded data bank. If the tag matches, then a data return crossbar is configured to return the 8-byte word from that data bank's port. In this way, if at least one lane performs a data lookup for a sub-cacheline word Y, then all lanes may consume word Y, even if they did not themselves win tag or data arbitration, thus servicing broadcast patterns.

Embodiments further enable coordination of disjoint cache instances. In an embodiment, a DCS may be configured to service less than all execution lanes. As one example, a cache architecture may include two DCS instantiations, each configured to service half of the execution lanes, so that these two DCS instantiations service all execution lanes in total. In such embodiment, there are two sets of 8 tag/data banks, each set of 8 for 16 execution lanes. Such partitioning may be useful to limit the fanout and wire lengths of the crossbar networks, which grow in area and delay superlinearly with the number of lanes. In addition, such partitioning naturally induces opportunity for cache lines to be duplicated among DCS instances. If a cache line exists in both DCS instances, then a lane's request that is a broadcast to all lanes from a single address would succeed in a single pass, but if a cache line is only loaded into one DCS then the lanes assigned to the other DCS instance would miss in their DCS cache.

As the coincident lane requests arrive at both DCS instances simultaneously, the DCS instances operate in virtual lock-step but do not directly coordinate. In the case of a load gather pattern, each DCS allocates fill buffers for its misses (for unique cache lines in general). But in the common case of a load broadcast pattern, both DCS instances may allocate a fill buffer for the same cache line. To avoid this duplication, an embodiment may be configured with a unified fill buffer arrangement and an interface to a next level cache such that a single fill buffer entry is created for both DCS instances for a given cache line miss from an implicit broadcast load. When filled, each DCS marks this cache line as shared. Upon eviction from a DCS, the other DCS cache line remains in a shared state and may serve as a victim cache for the other DCS should that cache line be missed in the other DCS in the future. Specifically, in the case of a broadcast load miss (where the other DCS does not co-allocate the fill buffer entry due to a hit), the fill buffer may probe the non-missing DCS with a refill snoop to fill the miss, instead of consuming next level cache bandwidth. With this arrangement, both cache line instances may be set in the shared state. Upon a non-broadcast load miss, the fill buffer probes the next level cache so as to not consume valuable read bandwidth from the other DCS, in one embodiment.

In embodiments, hash functions used for tag and data addresses may be configurable. This is so, to ensure that high throughput is achieved by fairly distributing memory accesses to all banks. In order to discover hash functions that obey the desired behavior, an offline combinational optimization may be performed using memory address traces collected from relevant benchmarks. From this information, an instantiation of a Boolean satisfiability (SAT) problem solver can be used to discover an optimal solution. By formulating the hash function discovery problem as an instance of SAT, constraints may be encoded into the optimization problem that closely match the DCS microarchitecture. For example, the optimization formulation may handle simultaneous optimization of the tag hash and lane-address hash functions in order to achieve highest throughput. Thus in addition to a static hash function, the DCS XOR hash calculation circuits may be dynamically configurable (to a limited degree). In this way, address profiling from dynamic optimization technology or other online monitor may be used to select a different pre-computed hash that has less induced conflicts. Another embodiment may profile an inner loop of a large work iteration space kernel to determine which address bits are variant in immediate offsets, to select the best hash function.

With embodiments, a relatively high average number of unique cache lines (e.g., 6-8) may be accessed for a given transaction. And a limited number of replay transactions occur to enable a complete transaction. For example, four distinct 32-lane transactions may consume on average a total of five passes through the DCS pipeline to fully complete. Still further, a cache architecture as described herein may enable access to up to 32 lines per transaction, achieving 256 bytes/cycle.

Figure 1B:
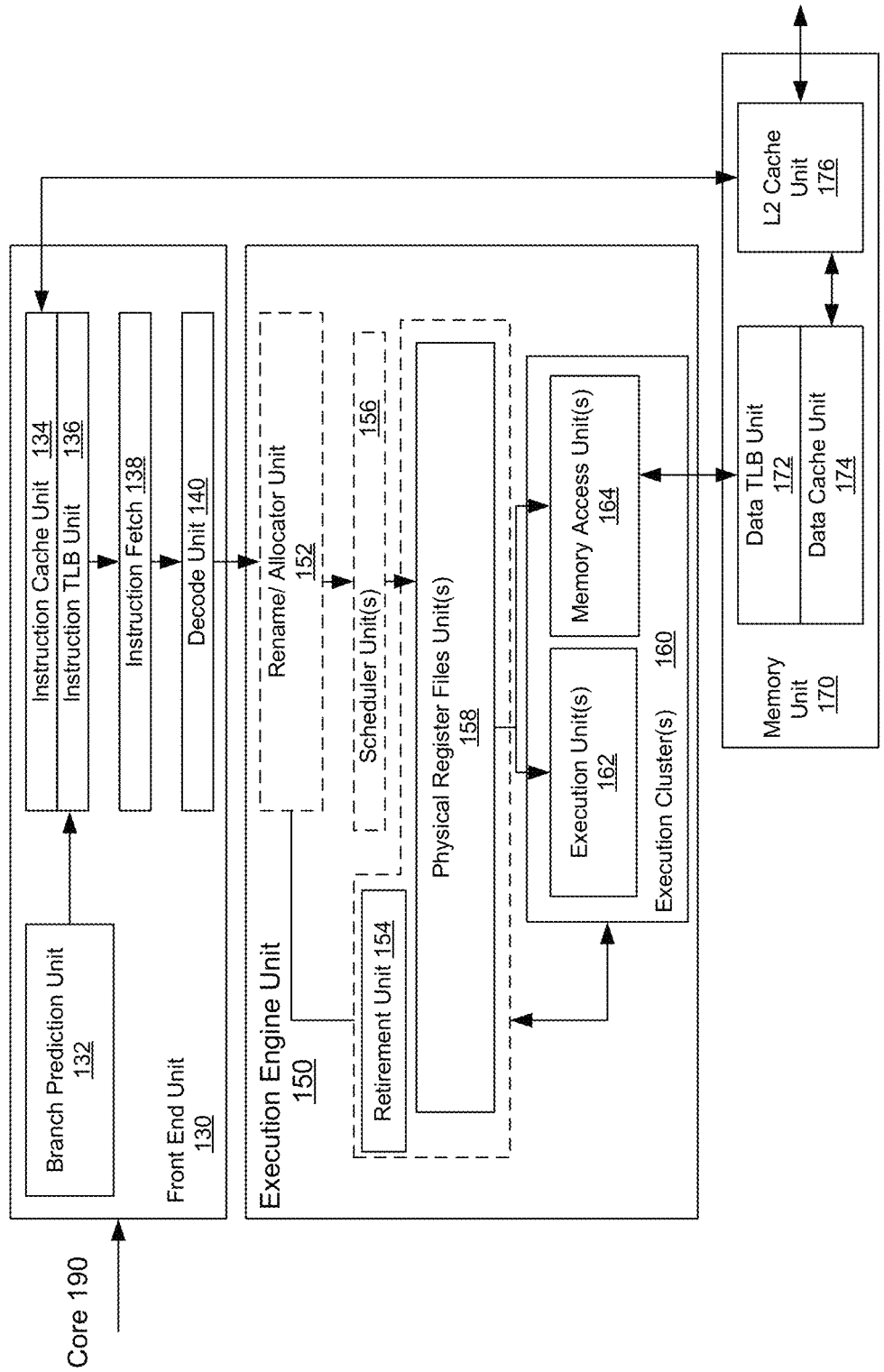
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring datapath is 1024-bits wide per direction in some embodiments.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
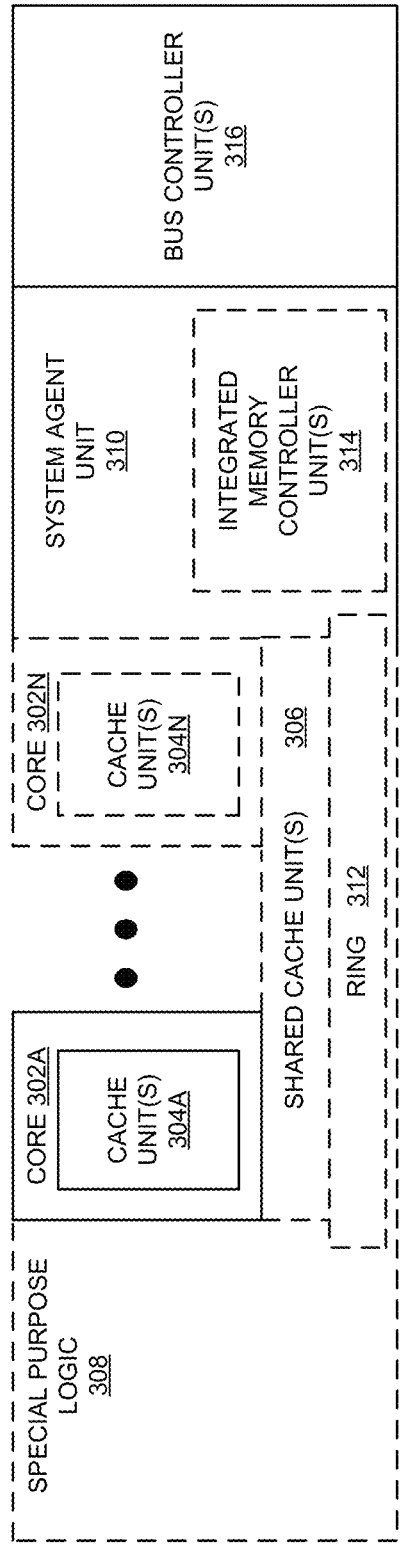
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 600 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
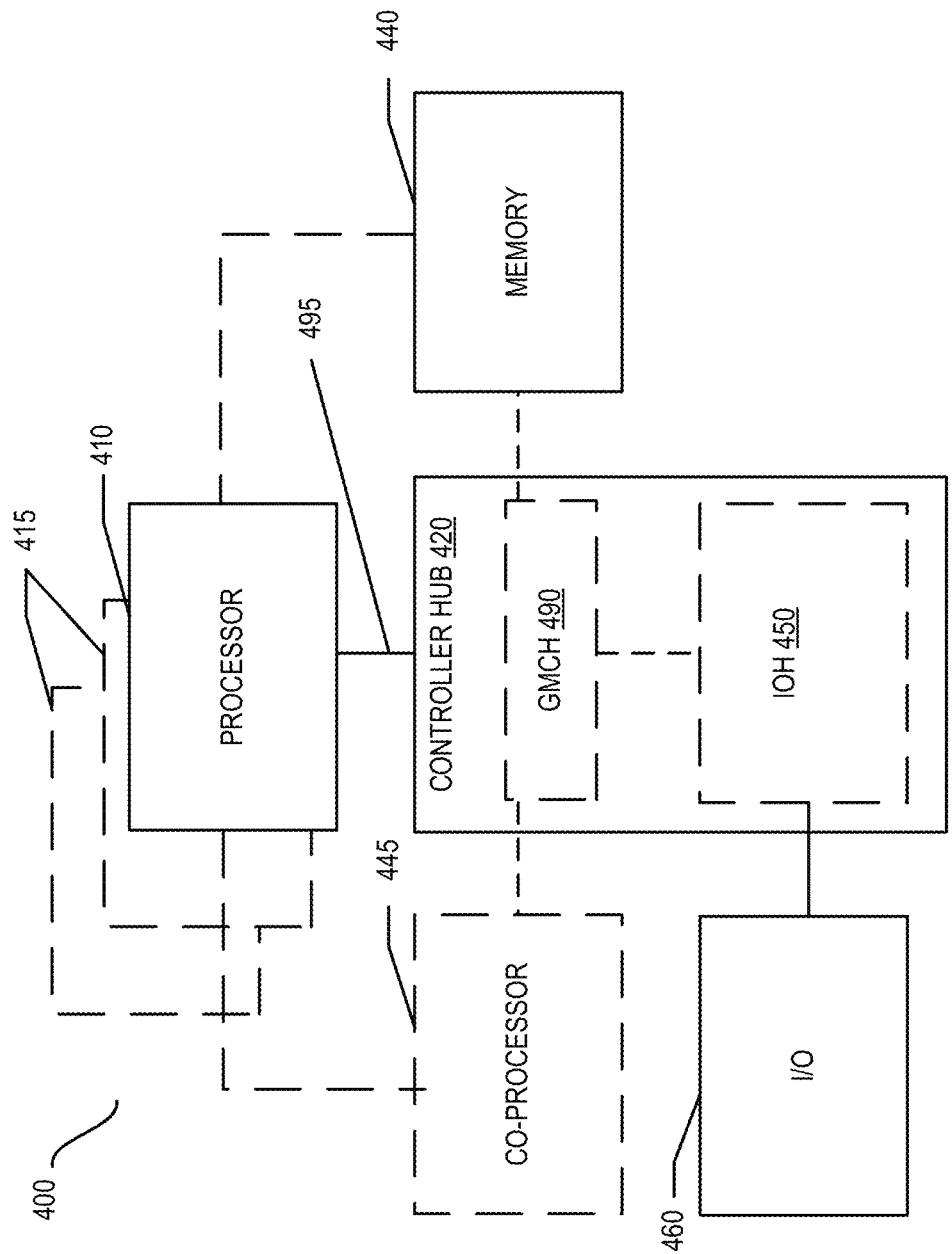
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
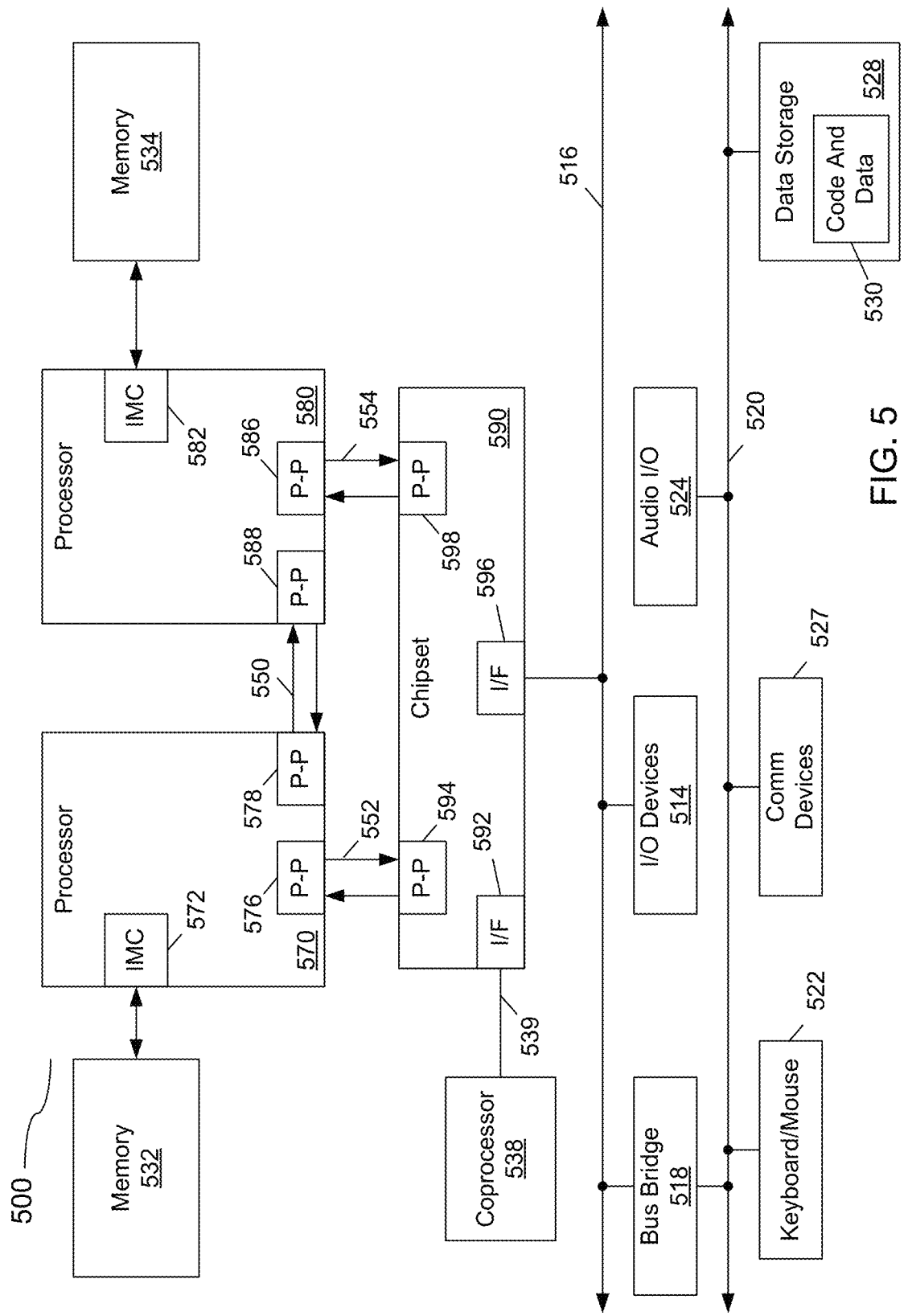
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 516. Note that other architectures are possible. For example, instead of the point-to-point architecture of FIG. 5, a system may implement a multi-drop bus or other such architecture.

Figure 6:
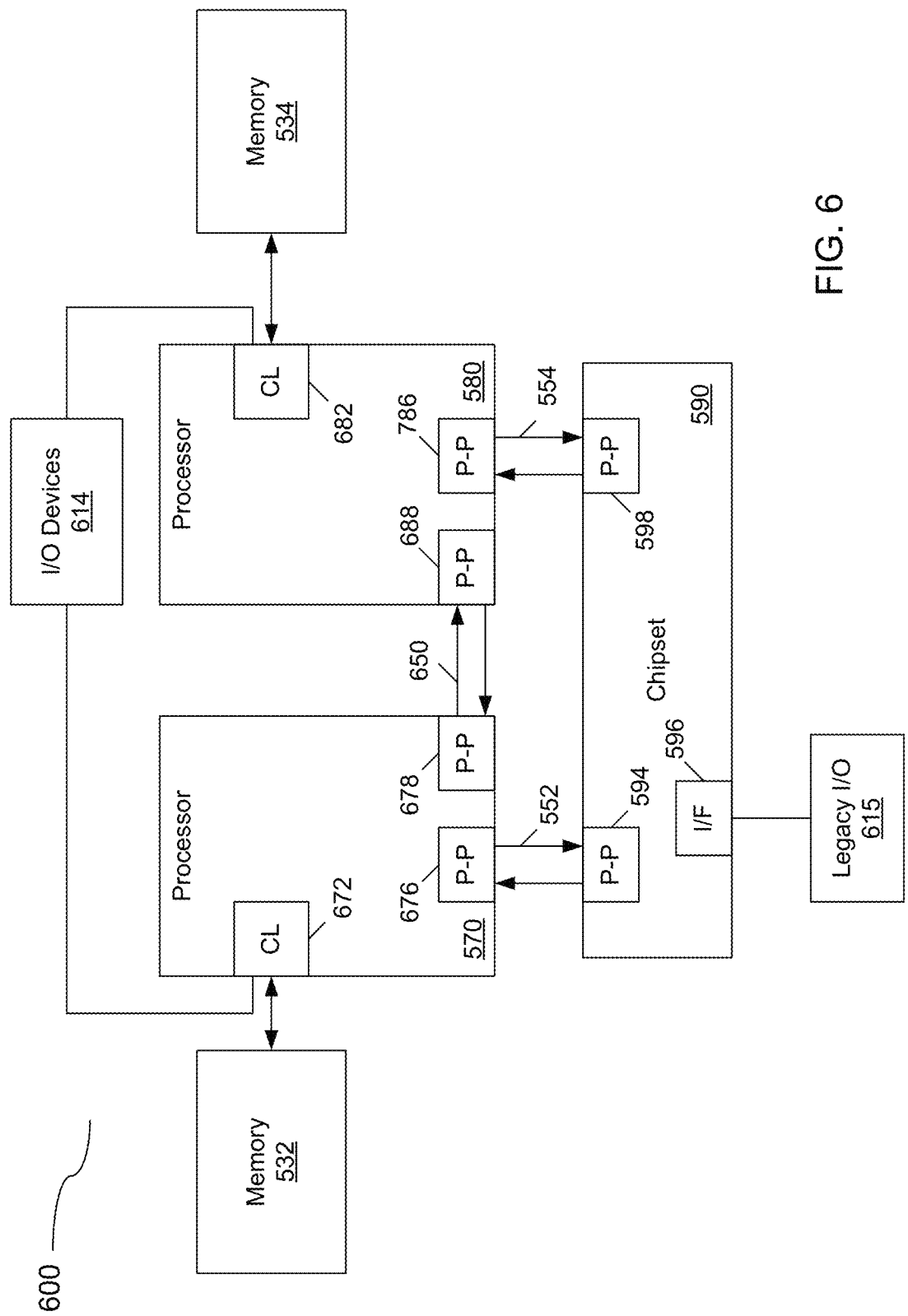
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
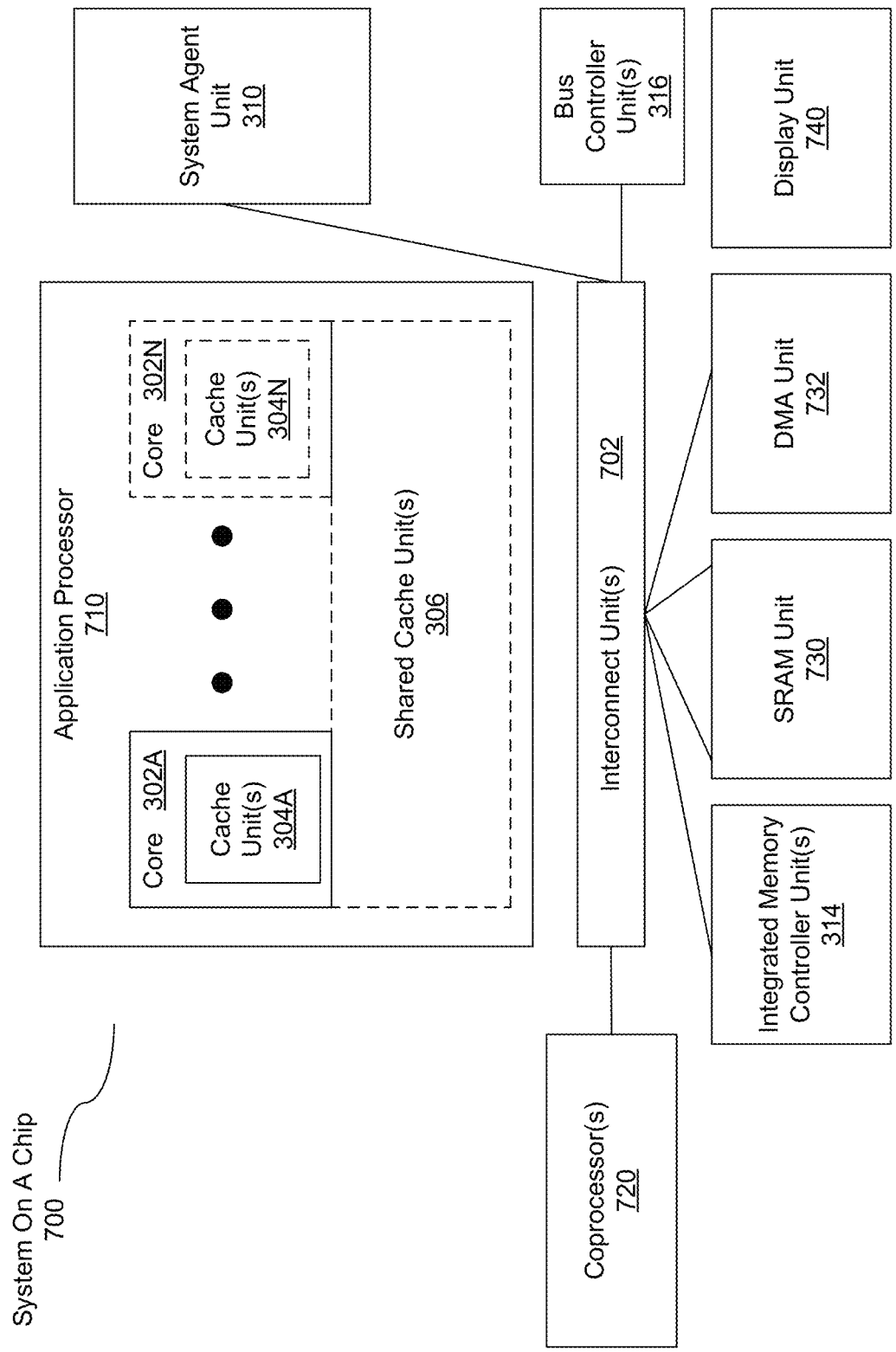
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include nontransitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
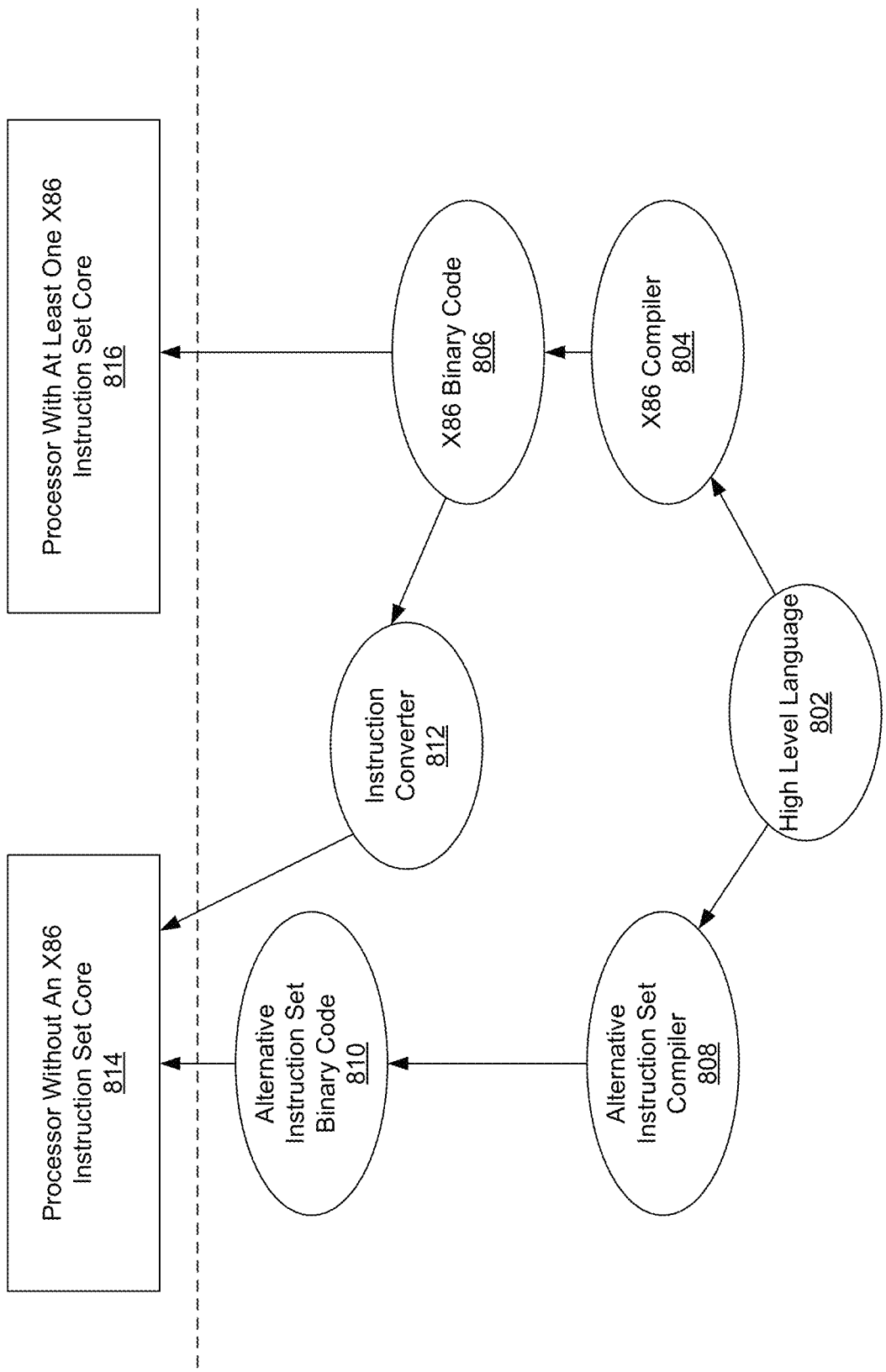
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

Instruction set architecture (ISA) extensions for accelerating data parallel workloads require explicit vector word lengths encoded in the machine representation. One embodiment of the invention extends an existing ISA (e.g., such as an x86 ISA) with a scalar microthreaded instruction processing architecture. In particular, a data parallel single program multiple data (SPMD) microarchitecture may be used to provide for scalable execution datapath sizes beyond the limitations of existing instructions, achieving greater instruction execution throughput with reduced energy consumption.

Current CPU architectures have used multiple generations of sub-word single instruction multiple data (SIMD) extensions for accelerating data parallel operations (e.g., including SSE2, SSE4, AVX, and AVX-512 in the x86 architecture). Each successive generation extends the state and instruction set of the CPU, creating legacy performance upside issues and requiring recompilation of old codes.

Graphics processing units (GPUs) have implemented SPMD architectures using hardware divergence stacks to handle divergent control flow cases. The hardware divergence stack is manipulated via explicit instructions and/or control codes as statically implemented by the finalizer agent for existing GPUs.

One embodiment of the invention includes a SPMID data parallel execution engine that uses a scalar microthread abstraction, similar to programming an array of scalar processors with no architected divergence instructions or control codes. As discussed below, these embodiments are particularly suitable for implementation in an existing ISA which includes a predefined Application Binary Interface (ABI).

Figure 9:
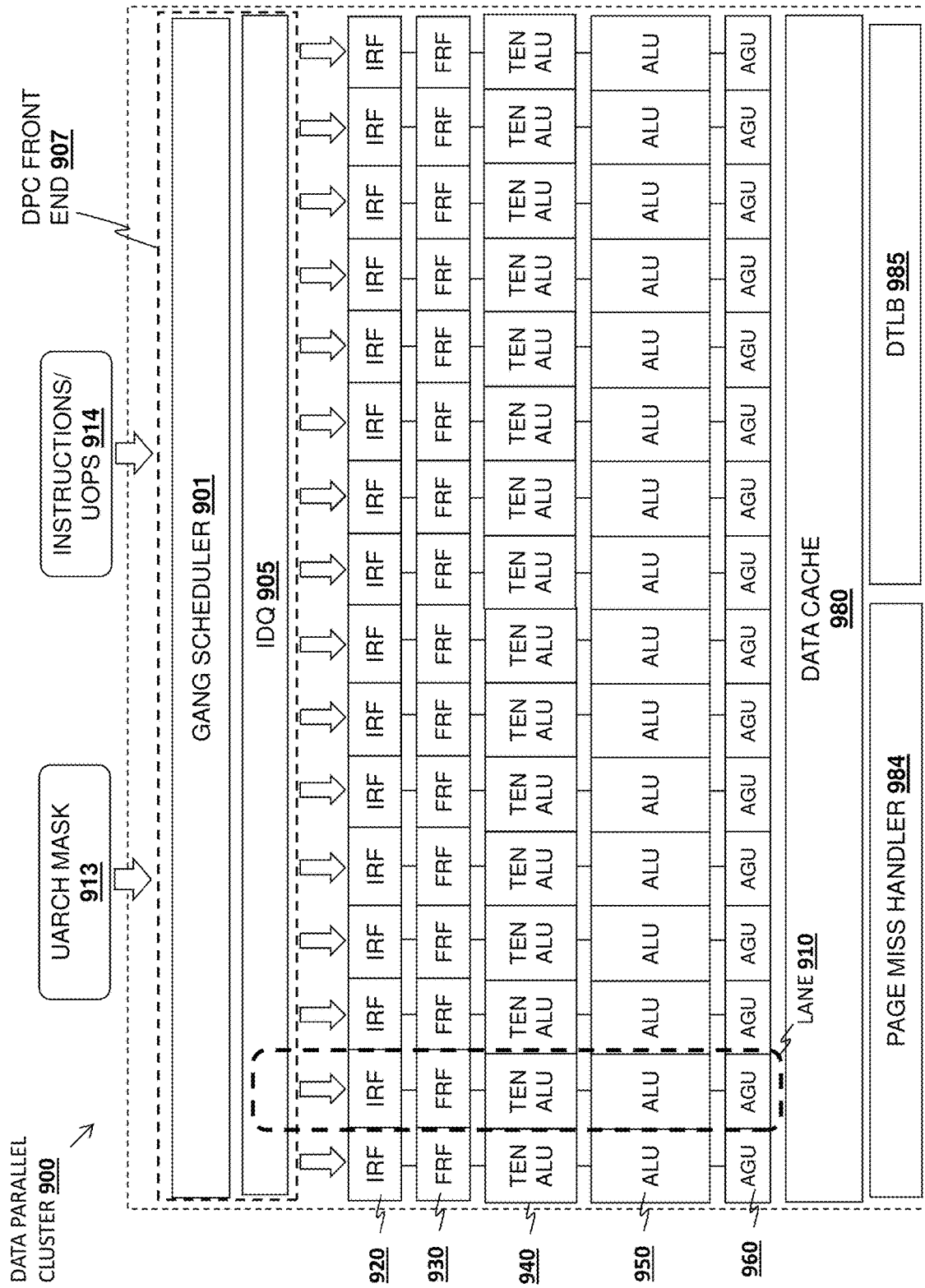
FIG. 9 is a block diagram illustrating one example of a data parallel cluster (DPC) in accordance with an embodiment of the present invention.

FIG. 9 illustrates one example of a data parallel cluster (DPC) 900 which may be integrated within a microarchitecture of a processor and/or may be used as an acceleration engine to execute a particular set of instructions/uops 914. In one embodiment, front end circuitry 907 comprises a gang scheduler 901 to schedule ganged execution of scalar microthreads within a plurality of scalar lanes such as lane 910. The number of scalar lanes in the data parallel cluster 900 can be varied without impacting software. In the illustrated implementation, 16 lanes are shown; however, any number of lanes may be used, depending on the implementation. In one embodiment, 32 lanes may be used.

In one embodiment, the gang scheduler 901 schedules the same instruction on multiple active lanes. A microarchitectural mask 913 (e.g., read from a mask register) disables those lanes that are not required to be active. In one embodiment, the gang scheduler 901 reads the mask values to determine which lanes are to be active for which instructions/uops.

In one embodiment, an instruction decode queue (IDQ) 905 within the front end 907 stores microoperations (uops) of decoded macroinstructions which are added to the IDQ in program order (e.g., in a FIFO implementation). As mentioned, the IDQ 905 may be partitioned for multiple gangs of operation.

Various arrangements for coupling the DPC 900 to a host processor are described below. In an implementation in which instructions are decoded by a host processor, the DPC 900 does not include a decoder to generate the uops prior to execution on the lanes. Alternatively, in an implementation in which macroinstructions are forwarded from a host processor or read directly from memory by the DPC, the front end of the DPC (e.g., the gang scheduler 901) includes a decoder to generate sequences of uops which are then stored in the IDQ prior to execution.

Each lane in the data parallel cluster 900 is coupled to the IDQ 905 from which it receives uops to be executed in parallel. In one embodiment, each lane includes an integer register file (IRF) 920 and a floating-point register file (FRF) 930 for storing integer and floating point operands, respectively. Each lane also includes a tensor arithmetic logic unit (ALU) 940 to perform adaptive lane-wise tensor processing (as described in greater detail below), a per-microthread scalar ALU 950, and a per-microthread, independent address generation unit 960. In one embodiment, the independent AGU 960 provides high throughput address generation for codes with gather/scatter memory access patterns. Other independent functional units may also be allocated to each lane. For example, in one embodiment, each lane is equipped with an independent jump execution unit (JEU) which allows the lanes to diverge and interact with the microarchitectural mask to provide the illusion of independent threads.

The illustrated architecture also includes a shared data cache 980 to store local copies of data for each of the lanes. In one embodiment, if the data parallel cluster 900 is integrated in a chip or system with a host processor, it participates in the cache coherency protocol implemented by the host processor. A page miss handler 984 performs page walk operations to translate virtual addresses to physical (system memory) addresses and a data translation lookaside buffer (DTLB) 985 caches the virtual-to-physical translations.

Figure 10A:
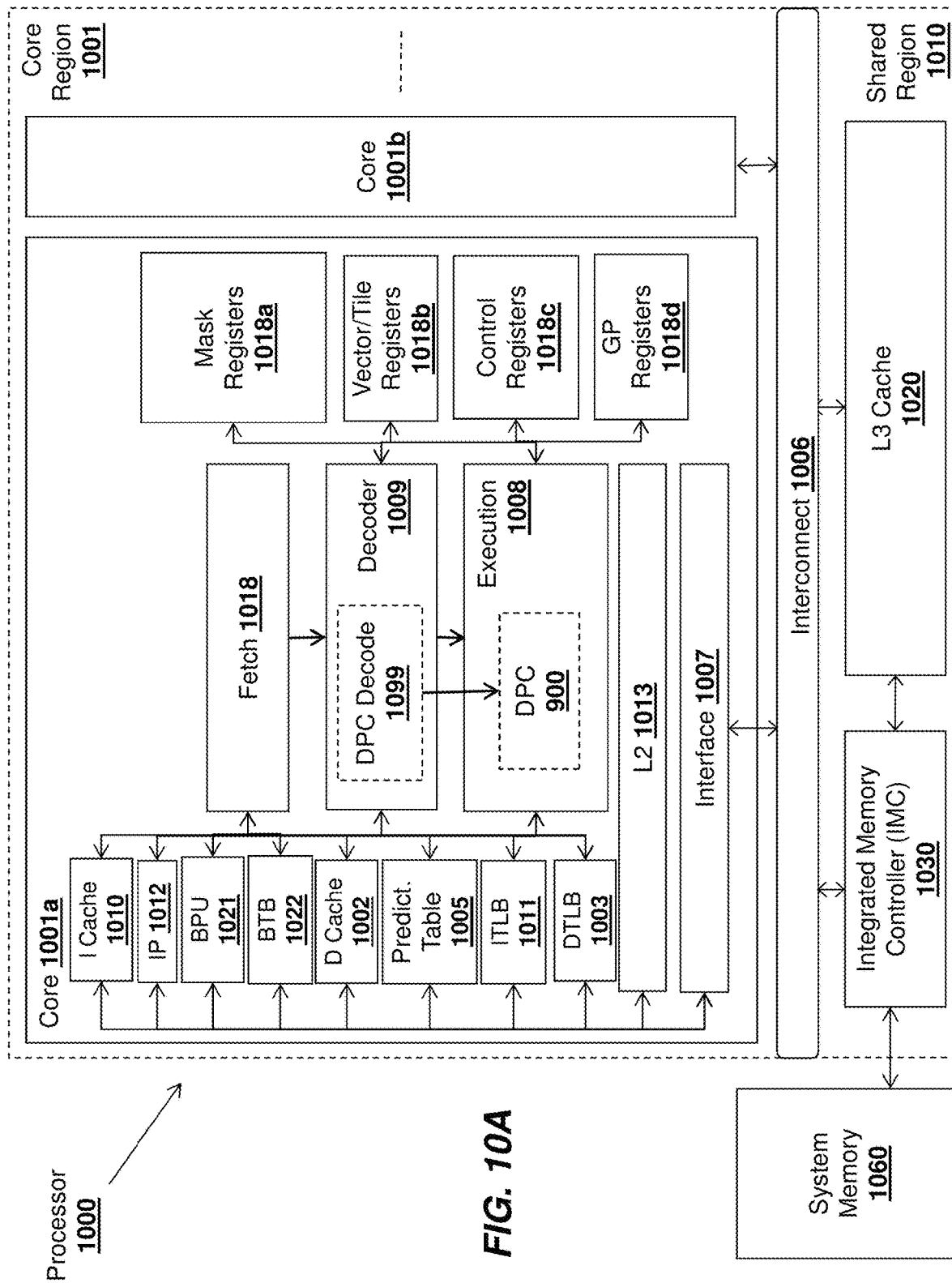
FIGS. 10A-C are block diagrams of the data parallel cluster integrated in a computer system in a variety of ways in accordance with an embodiment of the present invention.
Figure 10B:
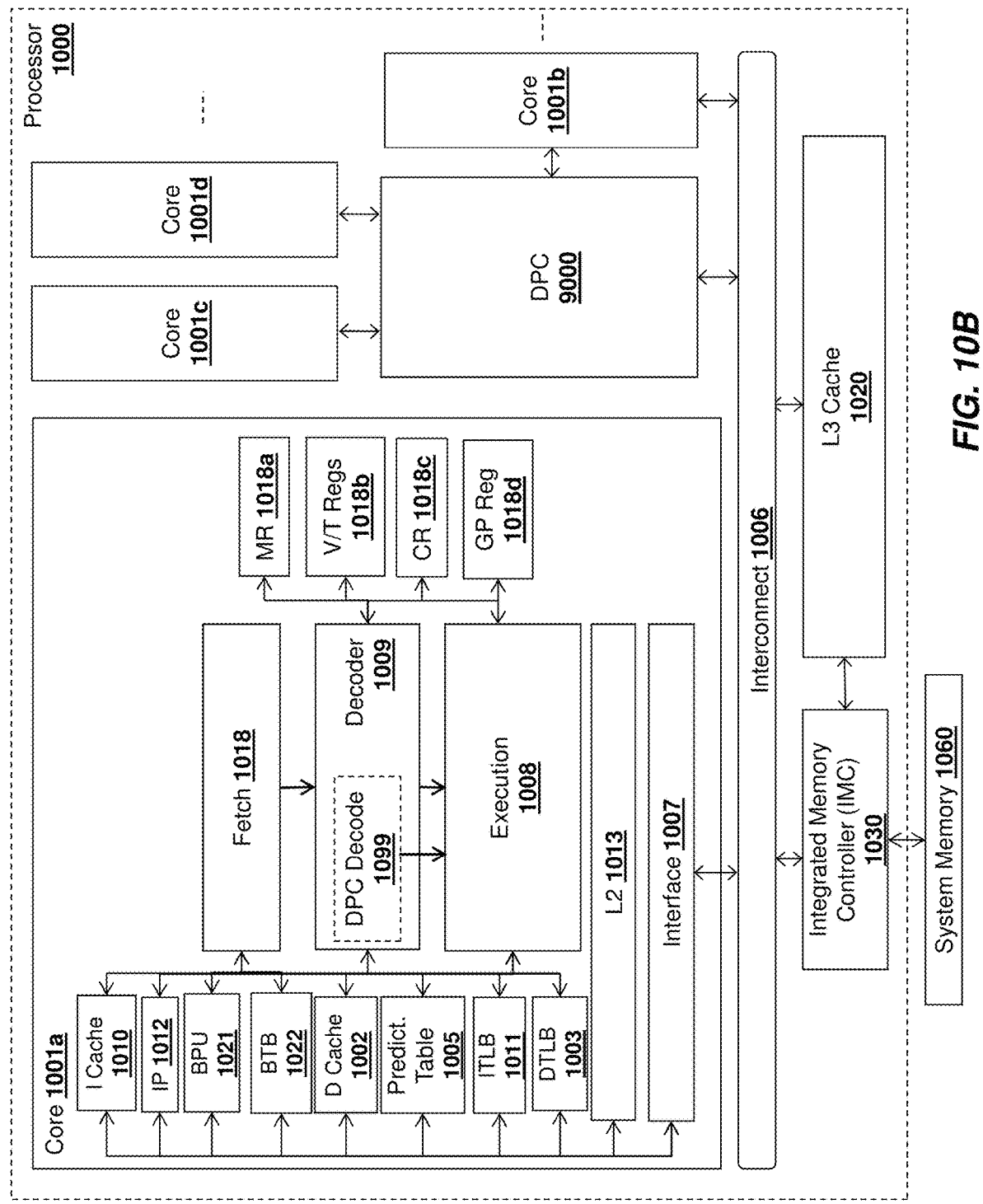
Figure 10C:
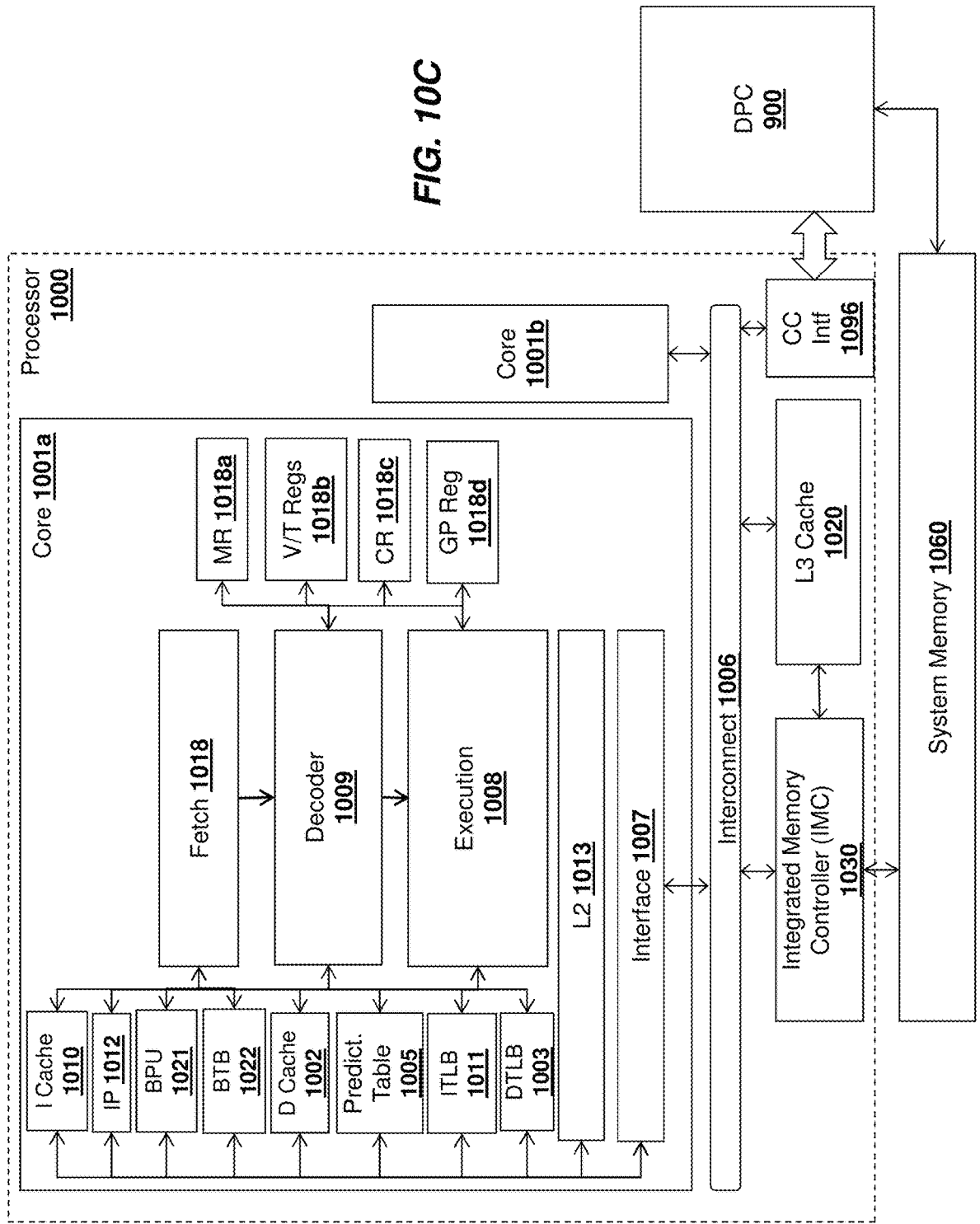

As illustrated in FIGS. 10A-C, the data parallel cluster 900 may be integrated in a computer system in a variety of ways. In FIG. 10A, the DPC 900 is integral to a core 1001a; in FIG. 10B, the DPC 900 is on the same chip and shared by a plurality of cores; and in FIG. 10C, the DPC 900 is on a different chip (but potentially in the same package) as the cores 1001a-b.

Turning first to FIG. 10A, the illustrated architectures include a core region 1001 and a shared, or "uncore" region 1010. The shared region 1010 includes data structures and circuitry shared by all or a subset of the cores 1001a-b. In the illustrated embodiment, the plurality of cores 1001a-b are simultaneous multithreaded cores capable of concurrently executing multiple instruction streams or threads. Although only two cores 1001a-b are illustrated in FIG. 10A for simplicity, it will be appreciated that the core region 1001 may include any number of cores, each of which may include the same architecture as shown for core 1001a. Another embodiment includes heterogeneous cores which may have different instruction set architectures and/or different power and performance characteristics (e.g., low power cores combined with high power/performance cores).

The various components illustrated in FIG. 10A may be implemented in the same manner as corresponding components in FIGS. 1-7. In addition, the cores 1001a may include the components of core 190 shown in FIG. 1B, and may include any of the other processor/core components described herein (e.g., FIGS. 2A-B, FIG. 3, etc.).

Each of the cores 1001a-b include instruction pipeline components for performing simultaneous execution of instruction streams including instruction fetch circuitry 1018 which fetches instructions from system memory 1060 or the instruction cache 1010 and decoder 1009 to decode the instructions. Execution circuitry 1008 executes the decoded instructions to perform the underlying operations, as specified by the instruction operands, opcodes, and any immediate values.

In the illustrated embodiment, the decoder 1009 includes DPC instruction decode circuitry 1099 to decode certain instructions into uops for execution by the DPC 900 (integrated within the execution circuitry 1008 in this embodiment). Although illustrated as separate blocks in FIG. 10A, the DPC decode circuitry 1099 and DPC 900 may be distributed as functional circuits spread throughout the decoder 1009 and execution circuitry 1008.

In an alternate embodiment, illustrated in FIG. 10B, the DPC 900 is tightly coupled to the processor cores 1001a-b over a cache coherent interconnect (e.g., in which a data cache participates in the same set of cache coherent memory transactions as the cores). The DPC 900 is configured as a peer of the cores, participating in the same set of cache coherent memory transactions as the cores. In this embodiment, the decoders 1009 decode the instructions which are to be executed DPC 900 and the resulting microoperations are passed for execution to the DPC 900 over the interconnect 1006. In another embodiment, the DPC 900 includes its own fetch and decode circuitry to fetch and decode instructions, respectively, from a particular region of system memory 1060. In either implementation, after executing the instructions, the DPC 900 may store the results to the region in system memory 1460 to be accessed by the cores 1001a-b.

FIG. 10C illustrates another embodiment in which the DPC is on a different chip from the cores 1001a-b but coupled to the cores over a cache coherent interface 1096. In one embodiment, the cache coherent interface 1096 uses packet-based transactions to ensure that the data cache 980 of the DPC 900 is coherent with the cache hierarchy of the cores 1001a-b.

Also illustrated in FIGS. 10A-C are general purpose registers (GPRs) 1018d, a set of vector/tile registers 1018b, a set of mask registers 1018a (which may include tile mask registers as described below), and a set of control registers 1018c. In one embodiment, multiple vector data elements are packed into each vector register which may have a 512 bit width for storing two 256 bit values, four 128 bit values, eight 64 bit values, sixteen 32 bit values, etc. Groups of vector registers may be combined to form the tile registers described herein. Alternatively, a separate set of 2-D tile registers may be used. However, the underlying principles of the invention are not limited to any particular size/type of vector/tile data. In one embodiment, the mask registers 1018a include eight 64-bit operand mask registers used for performing bit masking operations on the values stored in the vector registers 1018b (e.g., implemented as mask registers k0-k7 described above). However, the underlying principles of the invention are not limited to any particular mask register size/type. A set of one or more mask registers 1018a may implement the tile mask registers described herein.

The control registers 1018c store various types of control bits or "flags" which are used by executing instructions to determine the current state of the processor core 1001a. By way of example, and not limitation, in an x86 architecture, the control registers include the EFLAGS register.

An interconnect 1006 such as an in-die interconnect (IDI) or memory fabric implementing an IDI/coherence protocol communicatively couples the cores 1001a-b (and potentially a the DPC 900) to one another and to various components within the shared region 1010. For example, the interconnect 1006 couples core 1001a via interface 1007 to a level 3 (L3)

cache 1013 and an integrated memory controller 1030. In addition, the interconnect 1006 may be used to couple the cores 1001a-b to the DPC 900.

The integrated memory controller 1030 provides access to a system memory 1060. One or more input/output (I/O) circuits (not shown) such as PCI express circuitry may also be included in the shared region 1010.

An instruction pointer register 1012 stores an instruction pointer address identifying the next instruction to be fetched, decoded, and executed. Instructions may be fetched or prefetched from system memory 1060 and/or one or more shared cache levels such as an L2 cache 1013, the shared L3 cache 1020, or the L1 instruction cache 1010. In addition, an L1 data cache 1002 stores data loaded from system memory 1060 and/or retrieved from one of the other cache levels 1013, 1020 which cache both instructions and data. An instruction TLB (ITLB) 1011 stores virtual address to physical address translations for the instructions fetched by the fetch circuitry 1018 and a data TLB (DTLB) 1003 stores virtual-to-physical address translations for the data processed by the decode circuitry 1009 and execution circuitry 1008.

A branch prediction unit 1021 speculatively predicts instruction branch addresses and branch target buffers (BTBs) 1022 for storing branch addresses and target addresses. In one embodiment, a branch history table (not shown) or other data structure is maintained and updated for each branch prediction/misprediction and is used by the branch prediction unit 1002 to make subsequent branch predictions.

Note that FIGS. 10A-C are not intended to provide a comprehensive view of all circuitry and interconnects employed within a processor. Rather, components which are not pertinent to the embodiments of the invention are not shown. Conversely, some components are shown merely for the purpose of providing an example architecture in which embodiments of the invention may be implemented.

Returning to FIG. 9, the processing cluster 900 is arranged into a plurality of lanes 910 that encapsulate execution resources (e.g., an IRF 920, an FRF 930, a tensor ALU 940, an ALU 950, and an AGU 960) for several microthreads. Multiple threads share a given lane's execution resources in order to tolerate pipeline and memory latency. The per-microthread state for one implementation is a subset of a modern processor state.

Figure 11:
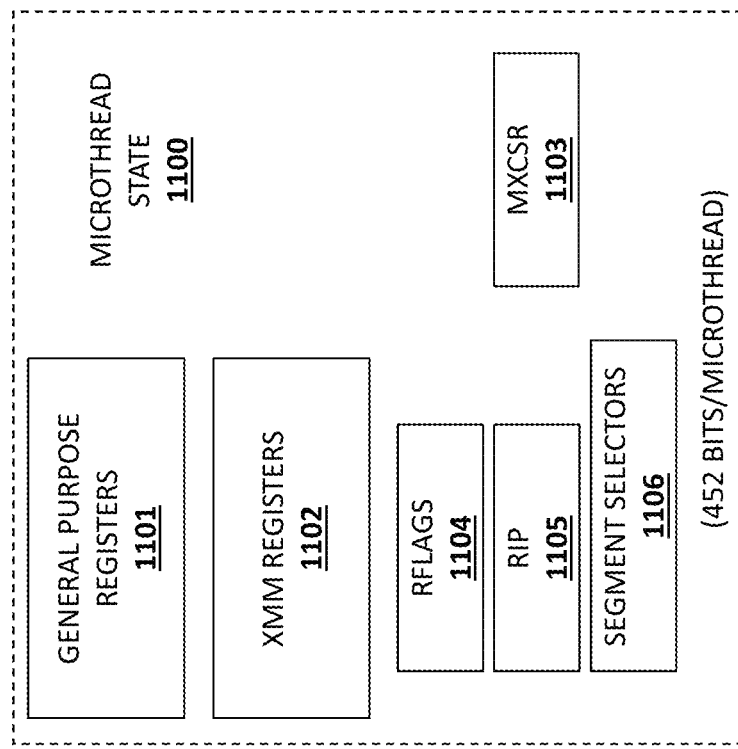
FIG. 11 illustrates one example of a microthread state in accordance with an embodiment of the present invention.

FIG. 11 illustrates one example of a microthread state 1100 which is a subset of a scalar x86 state. The microthread state 1100 includes state from general purpose registers 1101 (e.g., sixteen 64-bit registers), XMM registers 1102 (e.g., thirty-two 64-bit registers), an RFLAGS register 1104, an instruction pointer register 1105, segment selectors 1106, and the MXCSR register 1103. Using a subset of a scalar x86 is convenient for programmers, is software compatible with existing x86 codes, and requires minimal changes to current compilers and software toolchains. The lanes of this embodiment execute scalar, user-level instructions. Of course, the underlying principles of the invention are not limited to this particular arrangement.

Figure 12:
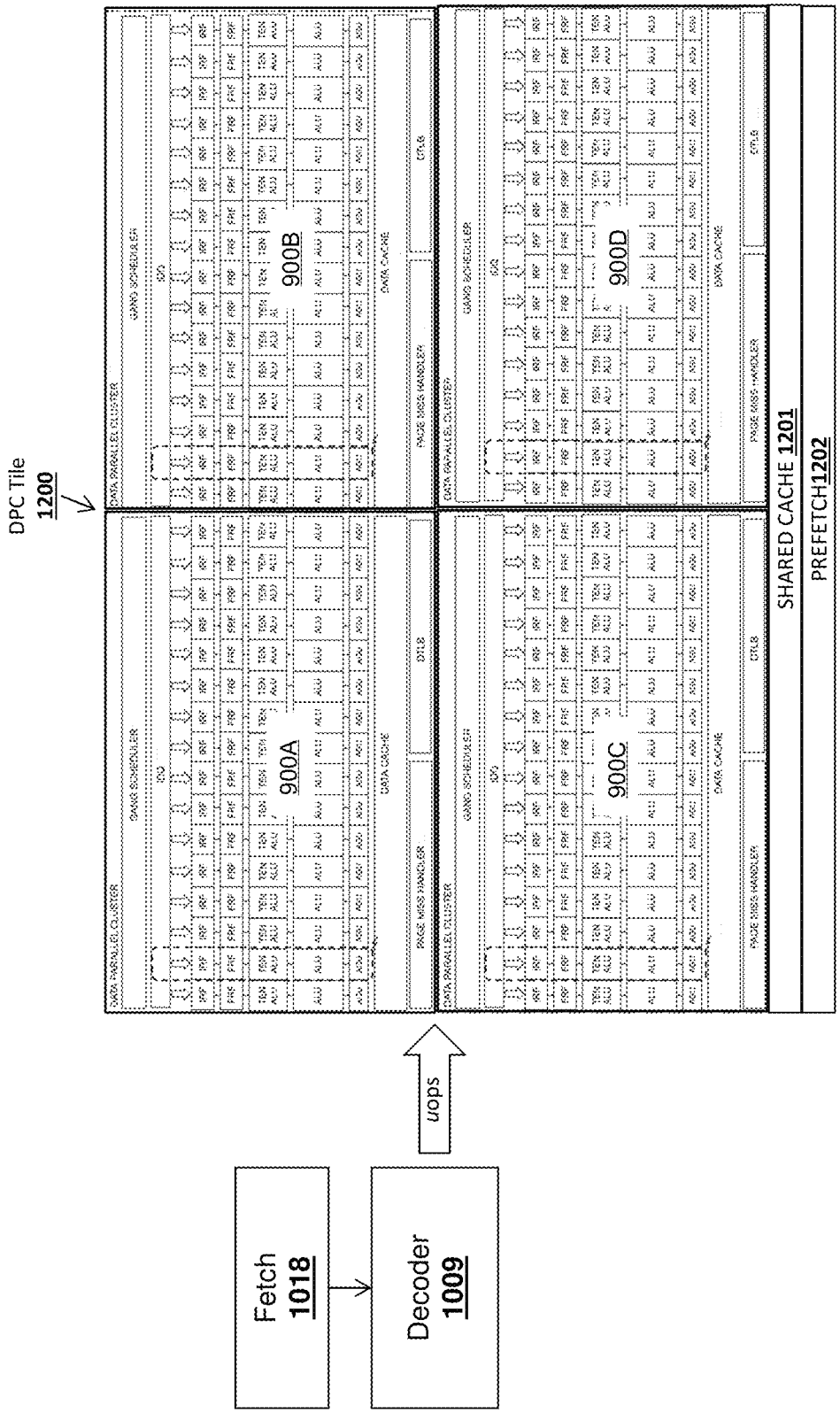
FIG. 12 is a block diagram of multiple data parallel clusters collocated into a larger unit of scaling in accordance with an embodiment of the present invention.

In one embodiment, illustrated in FIG. 12, multiple data parallel clusters 900A-D are collocated into a larger unit of scaling referred to as a "DPC tile" 1200. The various data parallel clusters 900A-D may be coupled to one another over a high speed interconnect of fabric. The DPC tile 1200 may be integrated within a processor or computer system using any of the microarchitectural implementations described above with respect to the single DPC 900 in FIG. 10A-C (i.e., DPC tile 1200 may be substituted for the DPC 900 in these figures).

The DPC tile 1200 includes a shared cache 1201 and relies on the existing fetch 1018 and decoder 1009 of one or more cores. A prefetcher 1202 prefetches data from system memory and/or the cache hierarchy in anticipation of uops executed on the data parallel clusters 900A-D. Although not illustrated, the shared cache 1201 may be coupled between the data parallel clusters 900A-D and each DPC 900A-D may be coupled to the on-chip interconnection network (e.g., IDI).

Sharing the execution resources of a processor across a whole cluster amortizes the relatively complex decode process performed by decoder 1009. One embodiment of the invention can support hundreds of microthreads executing instructions using a tiny fraction of the fetch 1018 and decoder 1009 resources of a conventional processor design.

Figure 13:
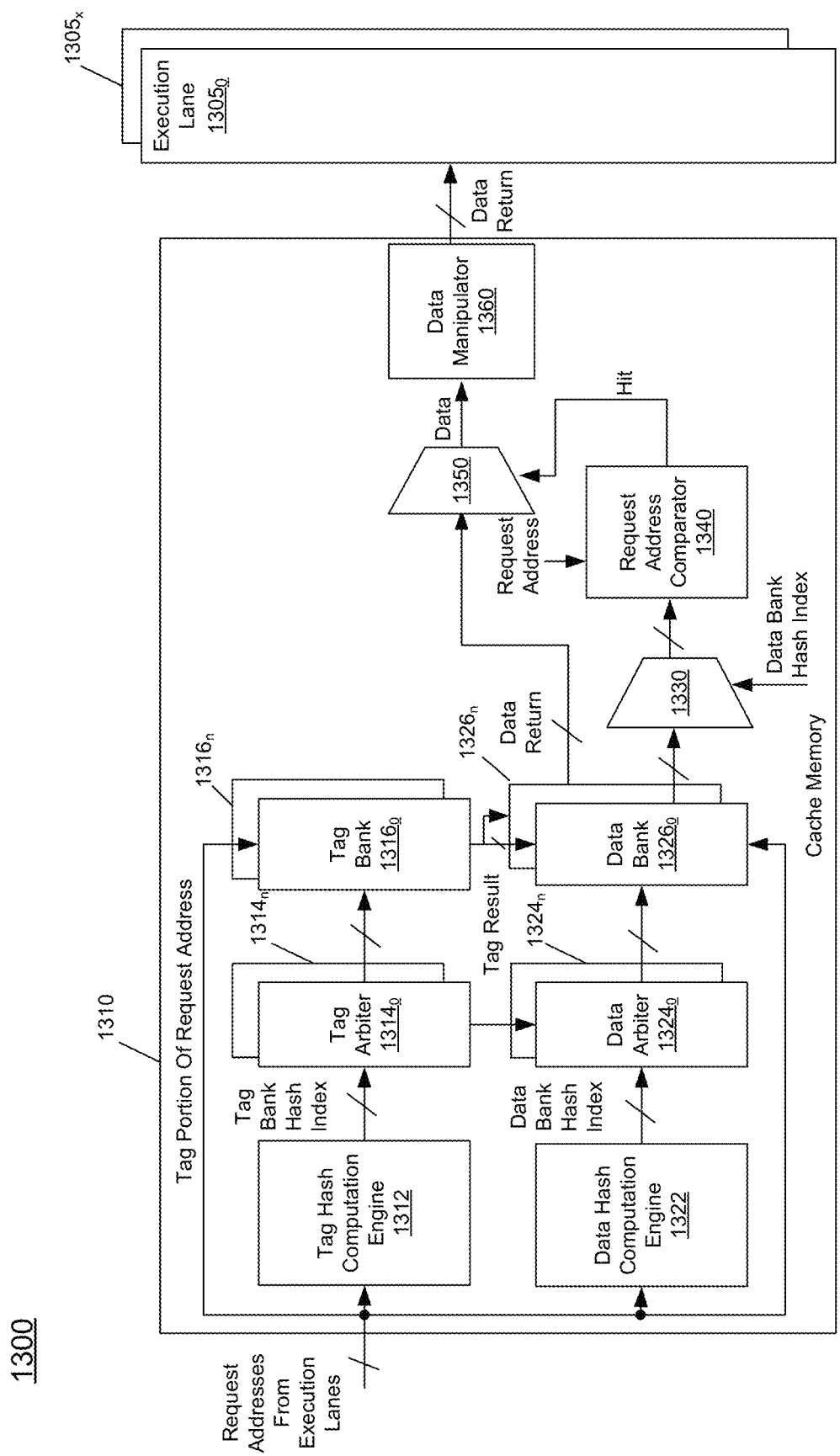
FIG. 13 is a high level block diagram of a cache memory in accordance with an embodiment.

Referring now to FIG. 13, shown is a high level block diagram of a processor in accordance with an embodiment. As shown in FIG. 13, processor 1300 may include a high throughput gather scatter cache architecture that leverages a design and techniques described herein. As illustrated, processor 1300 includes a cache memory 1310, which may act as a first-level cache memory that is coupled to a plurality of execution lanes $1305_0$-$1305_x$. Note that for ease of discussion and illustrative purposes, execution lanes 1305 are shown only at an output of cache memory 1310. However, understand that this logical representation is for purposes of discussing the arrangement of outputs from cache memory 1310, and that incoming request addresses to cache memory 1310 are received from execution lanes 1305.

As shown in FIG. 13, cache memory 1310 is configured to receive request addresses (e.g., a single request address from each execution lane 1305) per cycle. Cache memory 1310 may include a tag hash computation engine 1312 and a data hash computation engine 1322. These computation engines may be statically or dynamically arranged to perform a configurable hash function based on an incoming requested address received from circuitry of the execution lanes (not shown for ease of illustration in FIG. 13). Such request address may be a virtual address in some embodiments. In any event, based on this received requested address, hash computation engines 1312 and 1322 respectively generate tag indexes, e.g., in the form of bit vector components to identify a given one of multiple decoupled tag and data banks sought to be accessed for the request from a given execution lane. Note that hash computation engines 1312 and 1322 may include a plurality of computation engines, each to calculate a hash value for a given execution lane 1305.

Still with reference to FIG. 13, these separate tag and data indexes are provided to additional circuitry of cache memory 1310. More specifically as illustrated, the tag index (which is generated on a per execution lane basis) is provided to a set of tag arbiters $1314_0$-$1314_n$. For purposes of discussion, assume that there are 8 such tag arbiters. Each tag arbiter 1314 may perform an arbitration to determine a subset of execution lanes, i.e., the winning requesters, to access the corresponding tag bank. As such, tag arbiters 1314 each output control information to enable a subset of tag portions of the received request addresses (for these winning lanes) to be sent to the corresponding tag bank $1316_0$-$1316_n$, via coupling through a lane-to-tag bank crossbar (not shown in FIG. 13) that is configured based upon the arbitration result.

Similarly, the data index (which is generated on a per execution lane basis) is provided to a set of data arbiters $1324_0$-$1324_n$. For purposes of discussion, assume that there are 8 such data arbiters. Each data arbiter 1314 may perform an arbitration to determine a subset of execution lanes, i.e., the winning requesters, to access the corresponding data bank. As such, data arbiters 1324 each output control information to enable a subset of data portions of the received request addresses (for these winning lanes) to be sent to the corresponding data bank $1326_0$-$1326_n$, via coupling through a lane-to-data bank crossbar (not shown in FIG. 13) that is configured based upon the arbitration result. Note further as illustrated in FIG. 13, the tag arbitration results also are provided from tag arbiters 1314 to corresponding data arbiters 1324 for use in performing the data arbitration as described herein.

Note that the resulting tag values found from lookup into tag banks 1316 are provided as a tag result to data banks 1326 via a tag result crossbar. In an embodiment, a given tag result may include various information including a way number and so forth along with the tag used for the lookup in tag bank 1316. Note that tag banks 1316 may couple to data banks 1326 such that a resulting tag hit from a given tag bank 1316 may be delivered to any data bank 1326 that may require this tag result. This is so, as each data bank 1326 holds only a sub-cache line width of data for an entire cache line present as distributed across the set of data banks 1326.

Still with reference to FIG. 13, the data that is accessed in corresponding data banks 1326 is output as return data to the execution lanes via a data return crossbar. Note that each execution lane is configured to receive data return only from its requested data bank. In some cases, such data return occurs when an early tag comparison gates the data delivery crossbar, or in another embodiment tag and data can be delivered and compared just before delivery to execution lane.

As further shown in FIG. 13, cache memory 1310 may further include circuitry to configure the return of data to execution lanes 1305. To this end, cache memory 1310 may include a selection circuit 1330, e.g., implemented as a multiplexer to receive incoming data return addresses and based at least in part on the data bank hash index value, if a hit occurs send a data return address to a request address comparator 1340. In request address comparator 1340, a comparison is performed between the request address for the execution lane and the data return address to determine if a match occurs. If so, a hit is thus identified and hit data is provided through a data return multiplexer 1350. This hit data may optionally be provided to a data manipulator 1360, which may rotate the hit data to align the addressed subword to the first byte of the data return. Of course in other embodiments, data manipulator 1360 may perform further manipulations of return data, such as interleaving the byte pattern as specified by the SPMID opcode and potentially in an address or data dependent manner. As such, this requested data may be sent to a consuming circuit within one or more of execution lanes 1305. Understand that different pipeline arrangements may be present in other embodiments.

Note that with an embodiment herein, a fixed latency cache arrangement is provided and a variety of different data access patterns can be flexibly handled. Still further as described herein, a given execution lane 1305 may receive a return of requested data even in instances where that particular lane did not win either of tag or data arbitration. Understand while shown at this high level in the embodiment of FIG. 13, many variations and alternatives are possible.

Figure 14:
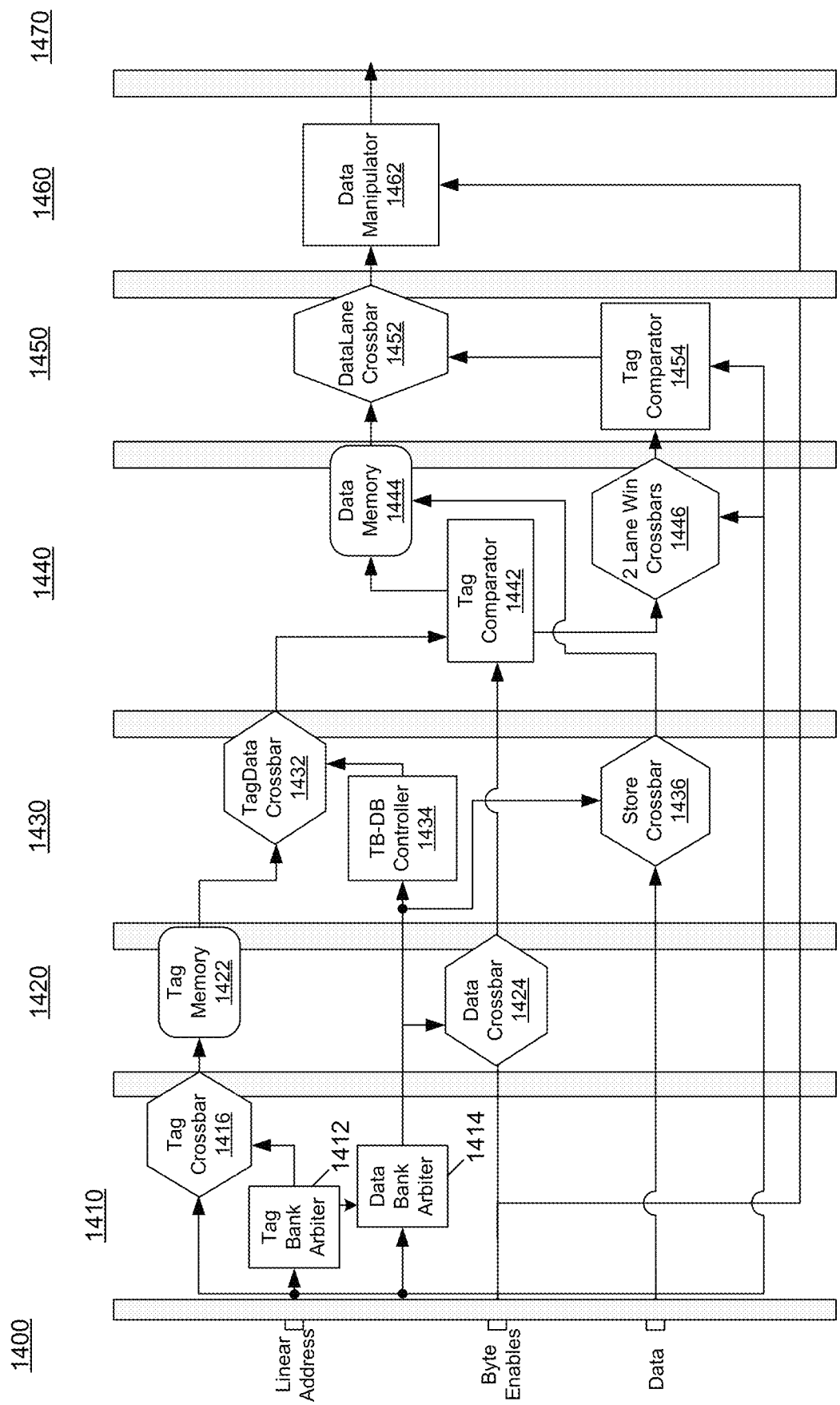
FIG. 14 is a high level block diagram of a pipeline of a cache memory in accordance with an embodiment.

Referring now to FIG. 14, shown is a high level block diagram of a pipeline of a cache memory in accordance with an embodiment. As shown in FIG. 14, a pipeline view of a cache memory 1400 is provided. In the embodiment of FIG. 14, seven pipeline stages 1410-1470 are illustrated. As shown, in a first pipeline stage 1410 a tag bank arbiter 1412 and a data bank arbiter 1414 are provided. As seen, an incoming request address is provided to these arbiters and also to a tag crossbar 1416, which may be configured by tag bank arbiter 1412. Based upon the configuration of tag crossbar 1416 in response to tag bank arbitration, a tag lookup is performed in a second pipeline stage 1420 within a tag memory 1422. In an embodiment, tag memory 1422 may be implemented as a multi-banked tag memory including a plurality of banks, e.g., 8 banks. In an embodiment, each bank may include 16 entries and may have two read ports per bank. In such embodiment, an input data width may be 58 bits while an output data width may be 62 bits.

As further shown in pipeline stage 1420, a data crossbar 1424 is configured to receive incoming control information from data bank arbiter 1414, in response to data bank arbitration. Note that in the embodiment of FIG. 14, an identification of the tag winners determined in tag bank arbiter 1414 is provided to data bank arbiter 1414, which may perform data bank arbitration based at least in part on the results of tag bank arbitration, to prioritize selection of the tag bank winners to be the data bank winners. In an embodiment, data crossbar 1424 may have a data width of 58 bits and have 16 inputs and 16 outputs which, as illustrated are provided to a tag comparator 1442, discussed further below.

In a third pipeline stage 1430, a tag data crossbar 1432 is coupled to an output of tag memory 1422, which receives the selected tag data output from tag memory 1422. This tag data is used to configure, further based on control information from a tag bank-data bank controller 1434, crossbar 1432 to provide tag information to tag comparator 1442. Also present in pipeline stage 1430 is a store crossbar 1436, which under control of data bank arbiter 1414 is used to pass data to banks within a data memory 1444, which as illustrated in FIG. 14 is decoupled from tag memory 1422.

In an embodiment, data memory 1444 may be a multi-banked cache memory, e.g., implemented with 8 banks. In an embodiment, each bank may include 256 entries having two read ports per bank and an input width of 64 bits and a similar output width. As further shown in FIG. 14, the result of tag comparator 1442 further may be provided to a lane winning crossbar 1446, which further receives the received linear addresses to configure another tag comparator 1454, which performs the comparisons and provides the tags of the winning lanes to a data lane crossbar 1452, also present in a fifth stage 1450. Based upon the received data from data memory 1444 and the winning tags, data lane crossbar 1452 is configured to send return data via additional pipeline stages 1460 and 1470 (via a data multiplexer 1462, which may be a mask/shifter), to given execution lanes. Understand while shown at this high level in the embodiment of FIG. 14, many variations and alternatives are possible.

Figure 15:
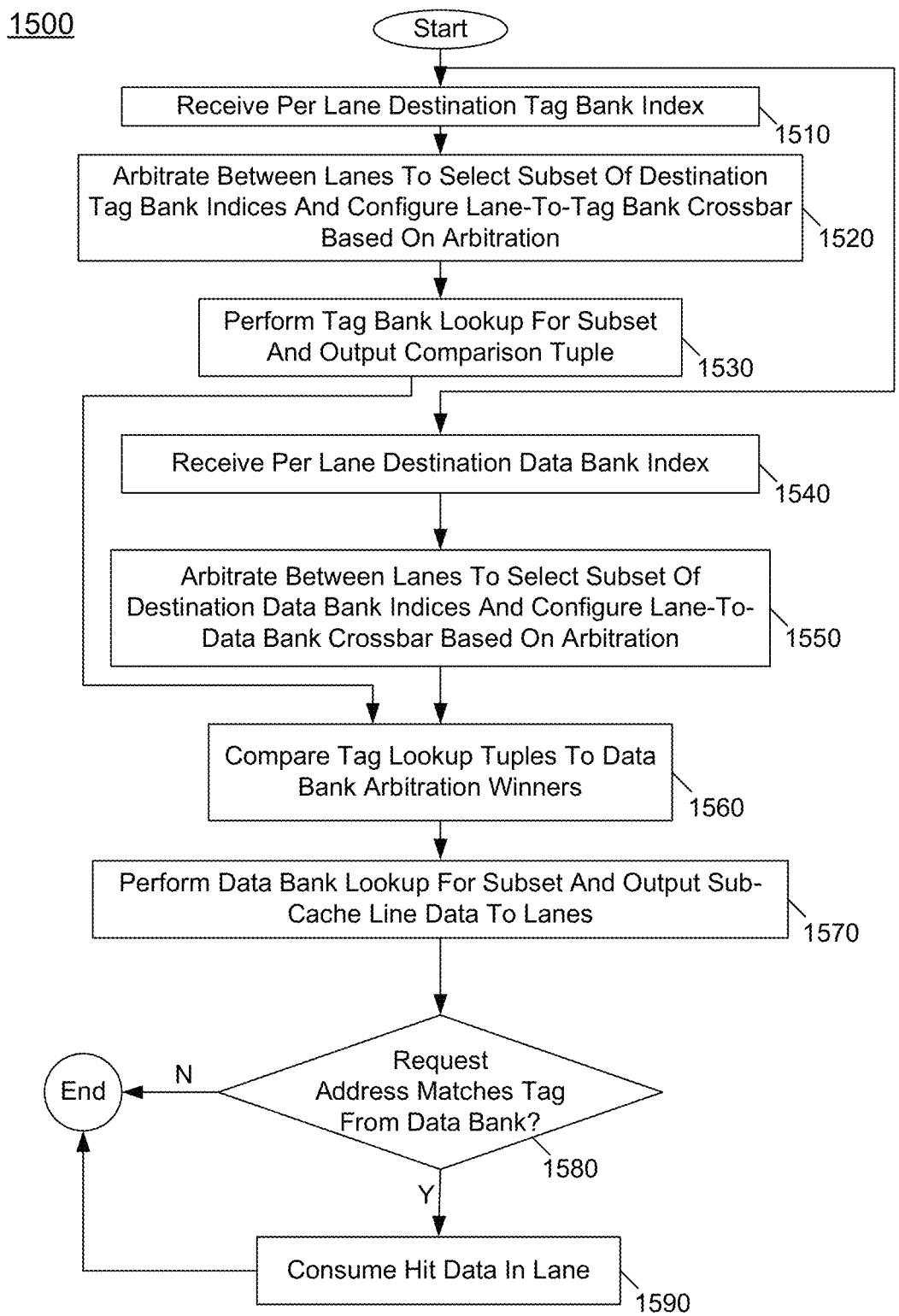
FIG. 15 is a flow diagram of a method in accordance with an embodiment of the present invention.

Referring now to FIG. 15, shown is a flow diagram of a method in accordance with an embodiment of the present invention. More specifically, method 1500 is a method for accessing a cache architecture in accordance with an embodiment. As such, method 1500 may be performed by hardware circuitry, firmware, software, and/or combinations thereof. In a particular embodiment, method 1500 may be performed by cache controller circuitry, such as a DCS and/or other circuitry within or coupled to a cache memory.

As illustrated in FIG. 15, method 1500 may proceed in parallel beginning with tag bank and data bank arbitration, which may proceed after generation of appropriate tag bank indices and data bank indices (which may be performed according to a configurable hash function as described above). As seen first with respect to tag bank arbitration, at block 1510, a per lane destination tag bank index is received. Such tag bank index may be generated on a per lane basis, e.g., according to a configurable tag function. At block 1520 an arbitration between lanes is performed in a tag arbiter to select a subset of destination tag bank indexes, where this subset is for a corresponding set of tag arbitration execution lane winners. Note that this tag arbitration may proceed on a per bank basis. Still further at block 1520 a lane-to-tag bank crossbar may be configured based on this arbitration. Thereafter at block 1530, a tag bank lookup may be performed to obtain a subset of tag values. Each tag bank may output a comparison tuple for e.g., up to two tag hits, that includes a tag result along with a given way identification, among other possible information.

Still referring to FIG. 15, at block 1540 a per lane destination data bank index may be received. As with the above discussion, this destination data bank index may be generated via a configurable hash function. At block 1550, an arbitration is performed between the lanes to select a subset of destination data bank indexes, where this subset is for a corresponding set of data arbitration execution lane winners. Note that this data arbitration may proceed on a per bank basis. Still further at block 1550 a lane-to-data bank crossbar may be configured based on this arbitration.

Still with reference to FIG. 15, following tag bank lookups and configuring of lane-to-data bank crossbars, a comparison is performed between tag lookup tuples to the data bank arbitration winners (block 1560), as may be performed in tag comparator 1442 (in the pipeline of FIG. 14). Then, at block 1570 a data bank lookup is performed in each of the data banks for the winning subset of data bank arbitration. As a result, sub-cacheline data may be output from each data bank. In a particular embodiment, two sub-cacheline data blocks may be output per data bank. And this hit one or more sub-cacheline data blocks may be output to a subset of the lanes, namely only those execution lanes that requested that data bank. Thus, with further reference to FIG. 15, it can be determined on a per lane basis whether a given request address of the lane matches the tags used for lookup in the data bank (diamond 1580). If not, this return of data is not further used in a given lane. Instead if a match is detected, the return data, whether or not a given execution lane was the winner of the tag or data arbitration, may be consumed within the lane (block 1590). For example, the return data may be provided to scheduler execution circuitry or buffer circuitry of the lane for use in one or more operations. Understand while shown at this high level in the embodiment of FIG. 15, many variations and alternatives are possible.

The following examples pertain to further embodiments.

In one example, an apparatus includes a cache memory having a fixed load-to-use latency pipeline. The cache memory comprises: a plurality of data banks, each of the plurality of data banks having a plurality of entries each to store a portion of a cache line distributed across the plurality of data banks; and a plurality of tag banks decoupled from the plurality of data banks, where a tag for a cache line is to be assigned to one of the plurality of tag banks.

In an example, the apparatus further comprises a first hash generator to receive at least a portion of a request address from a plurality of execution lanes and to generate a tag bank index per execution lane based on the request address, according to a configurable hash function.

In an example, the apparatus further comprises a second hash generator to receive at least a portion of the request address from the plurality of execution lanes and to generate a data bank index per execution lane based on the request address, according to a configurable hash function.

In an example, the cache memory further comprises a plurality of tag arbiters, where each of the plurality of tag arbiters is to receive the tag bank index per execution lane and select a first subset of the plurality of execution lanes based on the tag bank index per execution lane, and cause a tag portion of the request address from the first subset of the plurality of execution lanes to be sent to one of the plurality of tag banks.

In an example, the cache memory further comprises a plurality of data arbiters, where each of the plurality of data arbiters is to receive the data bank index per execution lane and select a second subset of the plurality of execution lanes based on the data bank index per execution lane, and cause at least a data portion of the request address from the second subset of the plurality of execution lanes to be sent to one of the plurality of data banks, where the data bank arbiter is to prioritize the selection based at least in part on the selection of the first subset of the plurality of execution lanes by the tag bank arbiter.

In an example, in response to a tag lookup hit by the tag portion of the request address, a first tag bank is to send a tag result of the lookup to a destination data bank requested by a first execution lane of the first subset of the plurality of execution lanes.

In an example, in response to a tag lookup hit for a first cache line by a first execution lane of the first subset of the plurality of execution lanes, at least some of the second subset of the plurality of execution lanes are to perform a data bank lookup for the first cache line.

In an example, in response to a data lookup hit for a first data portion of a first cache line, at least some of the plurality of execution lanes that did not win the tag arbiter selection or the data arbiter selection are to consume the first data portion.

In an example, each of the plurality of data banks is to store an 8-byte sub-cache line portion of the cache line.

In another example, a method comprises: arbitrating, in a tag arbiter of a cache memory, between a plurality of execution lanes each providing a request address to the cache memory to select a first subset of the plurality of execution lanes, the arbitrating based on a tag bank index generated from the request address, and providing a tag portion of the request address of the first subset of the plurality of execution lanes to a tag bank of the cache memory; arbitrating, in a data arbiter of the cache memory, between the plurality of execution lanes to select a second subset of the plurality of execution lanes, the arbitrating based on a data bank index generated from the request address, and providing at least a data portion of the request address of the second subset of the plurality of execution lanes to a data bank of the cache memory; performing a lookup in a data bank of the cache memory for the second subset of execution lanes, and outputting a sub-cache line data block from the data bank, to at least a portion of the plurality of execution lanes, to enable at least one of the portion of execution lanes to consume the sub-cache line data block, where the at least one execution lane did not win the tag arbitrating or the data arbitrating.

In an example, the method further comprises: configuring a lane-to-tag bank crossbar based on the tag arbitrating; and configuring a lane-to-data bank crossbar based on the data arbitrating.

In an example, the data arbitrating further comprises selecting the subset further based on a result of the tag arbitrating.

In an example, the method further comprises operating a pipeline of the cache memory with a fixed load-to-use latency.

In an example, the method further comprises storing a cache line including a plurality of sub-cache line data blocks distributed across a plurality of data banks of the cache memory.

In an example, the method further comprises enabling at least some of the plurality of execution lanes to perform a data lookup for a first cache line, when at least one execution lane of the plurality of execution lanes performs a tag lookup hit for the first data line.

In an example, the method further comprises enabling at least some of the plurality of execution lanes to consume the sub-cache line data block to service a broadcast pattern.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises a processor and a system memory coupled to the processor. The processor includes: a plurality of execution lanes to perform parallel execution of instructions, each of the plurality of execution lanes including one or more execution circuits to perform operations on a sub-cache line data block; and a cache memory coupled to the plurality of execution lanes. The cache memory includes: a plurality of data banks, each of the plurality of data banks having a plurality of entries each to store a sub-cache line data block, where the plurality of data banks are collectively to store a cache line formed of the sub-cache line data block stored in the plurality of data banks; and a plurality of tag banks decoupled from the plurality of data banks, where a tag for the cache line is to be assigned to one of the plurality of tag banks, where in response to a tag lookup hit in a first tag bank and data lookup hit in a first data bank in response to a request address from a first execution lane, the cache memory is to send a first sub-cache line data block to at least some of the plurality of execution lanes.

In an example, the cache memory further comprises: a first hash generator to receive at least a portion of the request address from the first execution lane and to generate a tag bank index based on the request address, according to a configurable hash function; and a second hash generator to receive at least a portion of the request address from the first execution lane and to generate a data bank index based on the request address, according to a configurable hash function.

In an example, the cache memory is to enable: the at least some of the plurality of execution lanes to perform a data lookup for the first sub-cache line data block, when a tag portion of a request address from a first execution lane hits in the first tag bank, the at least some of the plurality of execution lanes comprising winners of a data bank arbitration; and the at least some of the plurality of execution lanes to consume a second sub-cache line block in response to a data lookup hit to the second sub-cache line block by a first execution lane, where the at least some of the plurality of execution lanes did not win a tag bank arbitration or the data bank arbitration.

In an example, the cache memory further comprises: a plurality of tag arbiters, wherein each of the plurality of tag arbiters is to receive the tag bank index per execution lane and select a first subset of the plurality of execution lanes based on the tag bank index per execution lane, and cause a tag portion of the request address from the first subset of the plurality of execution lanes to be sent to one of the plurality of tag banks; and a plurality of data arbiters, wherein each of the plurality of data arbiters is to receive the data bank index per execution lane and select a second subset of the plurality of execution lanes based on the data bank index per execution lane, and cause at least a data portion of the request address from the second subset of the plurality of execution lanes to be sent to one of the plurality of data banks, wherein the data arbiter is to prioritize the selection based at least in part on the selection of the first subset of the plurality of execution lanes by the tag arbiter.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a cache memory having a fixed load-to-use latency pipeline, the cache memory comprising:
a plurality of data banks, each of the plurality of data banks having a plurality of entries each to store a portion of a cache line distributed across the plurality of data banks; and
a plurality of tag banks decoupled from the plurality of data banks, wherein a single tag for a cache line is to be assigned to one of the plurality of tag banks, and in response to a tag lookup hit and a data lookup hit for a request address from a first execution lane of a plurality of execution lanes, the cache memory is to send a first sub-cache line data block to at least some of the plurality of execution lanes.

2. The apparatus of claim 1, further comprising a first hash generator to receive at least a portion of a request address from the plurality of execution lanes and to generate a tag bank index per execution lane based on the request address, according to a configurable hash function.

3. The apparatus of claim 2, further comprising a second hash generator to receive at least a portion of the request address from the plurality of execution lanes and to generate a data bank index per execution lane based on the request address, according to a configurable hash function.

4. The apparatus of claim 3, wherein the cache memory further comprises a plurality of tag arbiters, wherein each of the plurality of tag arbiters is to receive the tag bank index per execution lane and select a first subset of the plurality of execution lanes based on the tag bank index per execution lane, and cause a tag portion of the request address from the first subset of the plurality of execution lanes to be sent to one of the plurality of tag banks.

5. The apparatus of claim 4, wherein the cache memory further comprises a plurality of data arbiters, wherein each of the plurality of data arbiters is to receive the data bank index per execution lane and select a second subset of the plurality of execution lanes based on the data bank index per execution lane, and cause at least a data portion of the request address from the second subset of the plurality of execution lanes to be sent to one of the plurality of data banks, wherein the data bank arbiter is to prioritize the selection based at least in part on the selection of the first subset of the plurality of execution lanes by the tag bank arbiter.

6. The apparatus of claim 5, wherein in response to a tag lookup hit by the tag portion of the request address, a first tag bank is to send a tag result of the lookup to a destination data bank requested by an execution lane of the first subset of the plurality of execution lanes.

7. The apparatus of claim 5, wherein in response to a tag lookup hit for a first cache line by an execution lane of the first subset of the plurality of execution lanes, at least some of the second subset of the plurality of execution lanes are to perform a data bank lookup for the first cache line.

8. The apparatus of claim 5, wherein in response to a data lookup hit for a first data portion of a first cache line, at least some of the plurality of execution lanes that did not win the tag arbiter selection or the data arbiter selection are to consume the first data portion.

9. The apparatus of claim 1, wherein each of the plurality of data banks is to store an 8-byte sub-cache line portion of the cache line.

10. A non-transitory machine-readable medium having stored thereon instructions, which if performed by a machine cause the machine to perform a method comprising:
arbitrating, in a tag arbiter of a cache memory, between a plurality of execution lanes each providing a request address to the cache memory to select a first subset of the plurality of execution lanes, the arbitrating based on a tag bank index generated from the request address, and providing a tag portion of the request address of the first subset of the plurality of execution lanes to a tag bank of the cache memory;
arbitrating, in a data arbiter of the cache memory, between the plurality of execution lanes to select a second subset of the plurality of execution lanes, the arbitrating based on a data bank index generated from the request address, and providing at least a data portion of the request address of the second subset of the plurality of execution lanes to a data bank of the cache memory;
performing a lookup in a data bank of the cache memory for the second subset of execution lanes, and outputting a sub-cache line data block from the data bank, to at least a portion of the plurality of execution lanes, to enable at least one of the portion of execution lanes to consume the sub-cache line data block, wherein the at least one execution lane did not win the tag arbitrating or the data arbitrating.

11. The non-transitory machine-readable medium of claim 10, wherein the method further comprises:
configuring a lane-to-tag bank crossbar based on the tag arbitrating; and
configuring a lane-to-data bank crossbar based on the data arbitrating.

12. The non-transitory machine-readable medium of claim 11, wherein the data arbitrating further comprises selecting the subset further based on a result of the tag arbitrating.

13. The non-transitory machine-readable medium of claim 11, wherein the method further comprises operating a pipeline of the cache memory with a fixed load-to-use latency.

14. The non-transitory machine-readable medium of claim 11, wherein the method further comprises storing a cache line including a plurality of sub-cache line data blocks distributed across a plurality of data banks of the cache memory.

15. The non-transitory machine-readable medium of claim 11, wherein the method further comprises enabling at least some of the plurality of execution lanes to perform a data lookup for a first cache line, when at least one execution lane of the plurality of execution lanes performs a tag lookup hit for the first data line.

16. The non-transitory machine-readable medium of claim 11, wherein the method further comprises enabling at least some of the plurality of execution lanes to consume the sub-cache line data block to service a broadcast pattern.

17. A system comprising:
a processor comprising:
a plurality of execution lanes to perform parallel execution of instructions, each of the plurality of execution lanes including one or more execution circuits to perform operations on a sub-cache line data block;
a cache memory coupled to the plurality of execution lanes, the cache memory comprising:

a plurality of data banks, each of the plurality of data banks having a plurality of entries each to store a sub-cache line data block, wherein the plurality of data banks are collectively to store a cache line formed of the sub-cache line data block stored in the plurality of data banks; and a plurality of tag banks decoupled from the plurality of data banks, wherein a tag for the cache line is to be assigned to one of the plurality of tag banks, wherein in response to a tag lookup hit in a first tag bank and a data lookup hit in a first data bank in response to a request address from a first execution lane, the cache memory is to send a first sub-cache line data block to at least some of the plurality of execution lanes; and a system memory coupled to the processor.

18. The system of claim 17, wherein the cache memory further comprises:

a first hash generator to receive at least a portion of the request address from the first execution lane and to generate a tag bank index based on the request address, according to a configurable hash function; and a second hash generator to receive at least a portion of the request address from the first execution lane and to generate a data bank index based on the request address, according to a configurable hash function.

19. The system of claim 17, wherein the cache memory is to enable:

the at least some of the plurality of execution lanes to perform a data lookup for the first sub-cache line data block, when a tag portion of a request address from a first execution lane hits in the first tag bank, the at least some of the plurality of execution lanes comprising winners of a data bank arbitration; and the at least some of the plurality of execution lanes to consume a second sub-cache line block in response to a data lookup hit to the second sub-cache line block by a first execution lane, wherein the at least some of the plurality of execution lanes did not win a tag bank arbitration or the data bank arbitration.

20. The system of claim 18, wherein the cache memory further comprises:

a plurality of tag arbiters, wherein each of the plurality of tag arbiters is to receive the tag bank index per execution lane and select a first subset of the plurality of execution lanes based on the tag bank index per execution lane, and cause a tag portion of the request address from the first subset of the plurality of execution lanes to be sent to one of the plurality of tag banks; and a plurality of data arbiters, wherein each of the plurality of data arbiters is to receive the data bank index per execution lane and select a second subset of the plurality of execution lanes based on the data bank index per execution lane, and cause at least a data portion of the request address from the second subset of the plurality of execution lanes to be sent to one of the plurality of data banks, wherein the data arbiter is to prioritize the selection based at least in part on the selection of the first subset of the plurality of execution lanes by the tag arbiter.

* * * * *